United States Patent
Pang et al.

(10) Patent No.: US 9,967,158 B2
(45) Date of Patent: May 8, 2018

(54) INTERACTIVE HIERARCHICAL NETWORK CHORD DIAGRAM FOR APPLICATION DEPENDENCY MAPPING

(71) Applicant: Cisco Technology, Inc., San Jose, CA (US)

(72) Inventors: Jackson Ngoc Ki Pang, Sunnyvale, CA (US); Michael Standish Watts, Mill Valley, CA (US); Ali Parandehgheibi, Sunnyvale, CA (US); Navindra Yadav, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 182 days.

(21) Appl. No.: 15/136,791

(22) Filed: Apr. 22, 2016

(65) Prior Publication Data
US 2016/0359700 A1    Dec. 8, 2016

Related U.S. Application Data

(60) Provisional application No. 62/171,899, filed on Jun. 5, 2015.

(51) Int. Cl.
G06F 15/173 (2006.01)
H04L 12/26 (2006.01)
H04L 12/24 (2006.01)

(52) U.S. Cl.
CPC .......... *H04L 43/026* (2013.01); *H04L 41/22* (2013.01); *H04L 43/062* (2013.01); *Y02B 60/33* (2013.01)

(58) Field of Classification Search
None
See application file for complete search history.

(56) References Cited

U.S. PATENT DOCUMENTS

| | | | |
|---|---|---|---|
| 5,742,829 A | 4/1998 | Davis et al. |
| 5,903,545 A | 5/1999 | Sabourin et al. |
| 6,012,096 A | 1/2000 | Link et al. |
| 6,144,962 A | 11/2000 | Weinberg et al. |
| 6,247,058 B1 | 6/2001 | Miller et al. |
| 6,330,562 B1 | 12/2001 | Boden et al. |

(Continued)

FOREIGN PATENT DOCUMENTS

| | | |
|---|---|---|
| CN | 101093452 | 12/2007 |
| CN | 101770551 | 7/2010 |

(Continued)

OTHER PUBLICATIONS

International Search Report and Written Opinion dated Aug. 17, 2016 for corresponding PCT Application No. PCT/US2016/035350.

(Continued)

*Primary Examiner* — Mohamed Ibrahim
(74) *Attorney, Agent, or Firm* — Polsinelli PC

(57) ABSTRACT

The technology visualizes data flows within a datacenter in an interactive hierarchical network chord diagram. Based on analyzed data describing data flows, a portion of the data flows that originate at the same first endpoint and terminate at the same second endpoint can be grouped. Subsequently, the dataflow monitoring system displays an interactive hierarchical network chord diagram to include a chord with a first endpoint and a second endpoint. The chord represents the grouped portion of data flows that originate at the same first endpoint and terminate at the same second endpoint. Upon receiving a selection of the chord or the first endpoint of the chord, the dataflow monitoring system expands the grouped portion of the data flows into a more granular representation of the network.

20 Claims, 11 Drawing Sheets

(56) References Cited

U.S. PATENT DOCUMENTS

| | | |
|---|---|---|
| 6,525,658 B2 | 2/2003 | Streetman et al. |
| 6,611,896 B1 | 8/2003 | Mason, Jr. et al. |
| 6,728,779 B1 | 4/2004 | Griffin et al. |
| 6,801,878 B1 | 10/2004 | Hintz et al. |
| 6,847,993 B1 | 1/2005 | Novaes et al. |
| 6,925,490 B1 | 8/2005 | Novaes et al. |
| 6,958,998 B2 | 10/2005 | Shorey |
| 6,983,323 B2 | 1/2006 | Cantrell et al. |
| 6,996,817 B2 | 2/2006 | Birum et al. |
| 7,002,464 B2 | 2/2006 | Bruemmer et al. |
| 7,120,934 B2 | 10/2006 | Ishikawa |
| 7,181,769 B1 | 2/2007 | Keanini et al. |
| 7,185,103 B1 | 2/2007 | Jain |
| 7,337,206 B1 | 2/2008 | Wen et al. |
| 7,353,511 B1 | 4/2008 | Ziese |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,466,681 B2 | 12/2008 | Ashwood-Smith et al. |
| 7,467,205 B1 | 12/2008 | Dempster et al. |
| 7,496,040 B2 | 2/2009 | Seo |
| 7,496,575 B2 | 2/2009 | Buccella et al. |
| 7,530,105 B2 | 5/2009 | Gilbert et al. |
| 7,610,330 B1 | 10/2009 | Quinn et al. |
| 7,633,942 B2 | 12/2009 | Bearden et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,752,307 B2 | 7/2010 | Takara |
| 7,783,457 B2 | 8/2010 | Cunningham |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |
| 7,873,025 B2 | 1/2011 | Patel et al. |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,135,657 B2 | 3/2012 | Kapoor et al. |
| 8,156,430 B2 | 4/2012 | Newman |
| 8,185,824 B1 | 5/2012 | Mitchell et al. |
| 8,250,657 B1 | 8/2012 | Nachenberg et al. |
| 8,255,972 B2 | 8/2012 | Azagury et al. |
| 8,266,697 B2 | 9/2012 | Coffman |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,370,407 B1 | 2/2013 | Devarajan et al. |
| 8,381,289 B1 | 2/2013 | Pereira et al. |
| 8,391,270 B2 | 3/2013 | Van Der Stok et al. |
| 8,407,164 B2 | 3/2013 | Malik et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,489,765 B2 | 7/2013 | Vasseur et al. |
| 8,516,590 B1 | 8/2013 | Ranadive et al. |
| 8,527,977 B1 | 9/2013 | Cheng et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,588,081 B2 | 11/2013 | Salam et al. |
| 8,600,726 B1 | 12/2013 | Varshney et al. |
| 8,630,316 B2 | 1/2014 | Haba |
| 8,640,086 B2 | 1/2014 | Bonev et al. |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,706,914 B2 | 4/2014 | Duchesneau |
| 8,719,452 B1 | 5/2014 | Ding et al. |
| 8,719,835 B2 | 5/2014 | Kanso et al. |
| 8,752,042 B2 | 6/2014 | Ratica |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,776,180 B2 | 7/2014 | Kumar et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,904,520 B1 | 12/2014 | Nachenberg et al. |
| 8,931,043 B2 | 1/2015 | Cooper et al. |
| 8,954,610 B2 | 2/2015 | Berke et al. |
| 8,973,147 B2 | 3/2015 | Pearcy et al. |
| 8,990,386 B2 | 3/2015 | He et al. |
| 8,996,695 B2 | 3/2015 | Anderson et al. |
| 8,997,227 B1 | 3/2015 | Mhatre et al. |
| 9,015,716 B2 | 4/2015 | Fletcher et al. |
| 9,071,575 B2 | 6/2015 | Lemaster et al. |
| 9,088,598 B1 | 7/2015 | Zhang et al. |
| 9,110,905 B2 | 8/2015 | Polley et al. |
| 9,160,764 B2 | 10/2015 | Stiansen et al. |
| 9,178,906 B1 | 11/2015 | Chen et al. |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,773 B2 | 1/2016 | Degioanni |
| 9,258,217 B2 | 2/2016 | Duffield et al. |
| 9,281,940 B2 | 3/2016 | Matsuda et al. |
| 9,317,574 B1 * | 4/2016 | Brisebois ............... G06Q 50/01 |
| 9,319,384 B2 | 4/2016 | Yan et al. |
| 9,405,903 B1 | 8/2016 | Xie et al. |
| 9,418,222 B1 | 8/2016 | Rivera et al. |
| 9,454,324 B1 * | 9/2016 | Madhavapeddi ..... G06F 3/0649 |
| 9,501,744 B1 * | 11/2016 | Brisebois ............... G06N 5/003 |
| 9,634,915 B2 | 4/2017 | Bley |
| 9,645,892 B1 | 5/2017 | Patwardhan |
| 9,733,973 B2 | 8/2017 | Prasad et al. |
| 2002/0053033 A1 | 5/2002 | Cooper et al. |
| 2002/0103793 A1 | 8/2002 | Koller et al. |
| 2002/0141343 A1 | 10/2002 | Bays |
| 2002/0184393 A1 | 12/2002 | Leddy et al. |
| 2003/0097439 A1 | 5/2003 | Strayer et al. |
| 2003/0145232 A1 | 7/2003 | Poletto et al. |
| 2003/0154399 A1 | 8/2003 | Zuk et al. |
| 2004/0030776 A1 | 2/2004 | Cantrell et al. |
| 2004/0268149 A1 | 12/2004 | Aaron |
| 2005/0039104 A1 | 2/2005 | Shah et al. |
| 2005/0166066 A1 | 7/2005 | Ahuja et al. |
| 2005/0207376 A1 | 9/2005 | Ashwood-Smith et al. |
| 2005/0257244 A1 | 11/2005 | Joly et al. |
| 2005/0289244 A1 | 12/2005 | Sahu et al. |
| 2006/0048218 A1 | 3/2006 | Lingafelt et al. |
| 2006/0080733 A1 | 4/2006 | Khosmood et al. |
| 2006/0095968 A1 | 5/2006 | Portolani et al. |
| 2006/0156408 A1 | 7/2006 | Himberger et al. |
| 2006/0195448 A1 | 8/2006 | Newport |
| 2006/0272018 A1 | 11/2006 | Fouant |
| 2006/0274659 A1 | 12/2006 | Ouderkirk |
| 2006/0294219 A1 | 12/2006 | Ogawa et al. |
| 2007/0044147 A1 | 2/2007 | Choi et al. |
| 2007/0097976 A1 | 5/2007 | Wood et al. |
| 2007/0169179 A1 | 7/2007 | Narad |
| 2007/0195729 A1 | 8/2007 | Li et al. |
| 2007/0195797 A1 | 8/2007 | Patel et al. |
| 2007/0211637 A1 | 9/2007 | Mitchell |
| 2007/0300061 A1 | 12/2007 | Kim et al. |
| 2008/0022385 A1 | 1/2008 | Crowell et al. |
| 2008/0082662 A1 | 4/2008 | Danliker et al. |
| 2008/0101234 A1 | 5/2008 | Nakil et al. |

(56) References Cited

U.S. PATENT DOCUMENTS

| | | | |
|---|---|---|---|
| 2008/0126534 A1* | 5/2008 | Mueller | G06F 11/3409 709/224 |
| 2008/0250122 A1 | 10/2008 | Zsigmond et al. | |
| 2008/0270199 A1 | 10/2008 | Chess et al. | |
| 2008/0301765 A1 | 12/2008 | Nicol et al. | |
| 2009/0064332 A1 | 3/2009 | Porras et al. | |
| 2009/0241170 A1 | 9/2009 | Kumar, Sr. et al. | |
| 2009/0307753 A1 | 12/2009 | Dupont et al. | |
| 2009/0313373 A1 | 12/2009 | Hanna et al. | |
| 2009/0313698 A1 | 12/2009 | Wahl | |
| 2009/0328219 A1 | 12/2009 | Narayanaswamy | |
| 2010/0005288 A1 | 1/2010 | Rao et al. | |
| 2010/0077445 A1 | 3/2010 | Schneider et al. | |
| 2010/0095293 A1 | 4/2010 | O'Neill et al. | |
| 2010/0095367 A1 | 4/2010 | Narayanaswamy | |
| 2010/0138810 A1 | 6/2010 | Komatsu et al. | |
| 2010/0148940 A1 | 6/2010 | Gelvin et al. | |
| 2010/0153316 A1 | 6/2010 | Duffield et al. | |
| 2010/0153696 A1 | 6/2010 | Beachem et al. | |
| 2010/0220584 A1 | 9/2010 | DeHaan et al. | |
| 2010/0235514 A1 | 9/2010 | Beachem | |
| 2010/0235915 A1 | 9/2010 | Memon et al. | |
| 2010/0303240 A1 | 12/2010 | Beachem | |
| 2010/0319060 A1 | 12/2010 | Aiken et al. | |
| 2011/0010585 A1 | 1/2011 | Bugenhagen et al. | |
| 2011/0055381 A1 | 3/2011 | Narasimhan et al. | |
| 2011/0055388 A1 | 3/2011 | Yumerefendi et al. | |
| 2011/0066719 A1 | 3/2011 | Miryanov et al. | |
| 2011/0069685 A1 | 3/2011 | Tofighbakhsh | |
| 2011/0083125 A1 | 4/2011 | Komatsu et al. | |
| 2011/0126275 A1 | 5/2011 | Anderson et al. | |
| 2011/0145885 A1 | 6/2011 | Rivers et al. | |
| 2011/0170860 A1 | 7/2011 | Smith et al. | |
| 2011/0173490 A1 | 7/2011 | Narayanaswamy et al. | |
| 2011/0185423 A1 | 7/2011 | Sallam | |
| 2011/0196957 A1 | 8/2011 | Ayachitula et al. | |
| 2011/0202655 A1 | 8/2011 | Sharma et al. | |
| 2011/0225207 A1 | 9/2011 | Subramanian et al. | |
| 2011/0228696 A1 | 9/2011 | Agarwal et al. | |
| 2011/0302652 A1 | 12/2011 | Westerfeld | |
| 2011/0314148 A1 | 12/2011 | Petersen et al. | |
| 2012/0005542 A1 | 1/2012 | Petersen et al. | |
| 2012/0079592 A1 | 3/2012 | Pandrangi | |
| 2012/0102361 A1 | 4/2012 | Sass et al. | |
| 2012/0102543 A1 | 4/2012 | Kohli et al. | |
| 2012/0117226 A1 | 5/2012 | Tanaka et al. | |
| 2012/0136996 A1 | 5/2012 | Seo et al. | |
| 2012/0137278 A1 | 5/2012 | Draper et al. | |
| 2012/0140626 A1 | 6/2012 | Anand et al. | |
| 2012/0197856 A1 | 8/2012 | Banka et al. | |
| 2012/0198541 A1 | 8/2012 | Reeves | |
| 2012/0216271 A1 | 8/2012 | Cooper et al. | |
| 2012/0233473 A1 | 9/2012 | Vasseur et al. | |
| 2012/0240232 A1 | 9/2012 | Azuma | |
| 2012/0246303 A1 | 9/2012 | Petersen et al. | |
| 2012/0278021 A1 | 11/2012 | Lin et al. | |
| 2013/0003538 A1 | 1/2013 | Greenburg et al. | |
| 2013/0006935 A1 | 1/2013 | Grisby | |
| 2013/0038358 A1 | 2/2013 | Cook et al. | |
| 2013/0086272 A1 | 4/2013 | Chen et al. | |
| 2013/0103827 A1 | 4/2013 | Dunlap et al. | |
| 2013/0145099 A1 | 6/2013 | Liu et al. | |
| 2013/0159999 A1 | 6/2013 | Chiueh et al. | |
| 2013/0179487 A1 | 7/2013 | Lubetzky et al. | |
| 2013/0179879 A1 | 7/2013 | Zhang et al. | |
| 2013/0198839 A1 | 8/2013 | Wei et al. | |
| 2013/0246925 A1 | 9/2013 | Ahuja et al. | |
| 2013/0247201 A1 | 9/2013 | Alperovitch et al. | |
| 2013/0254879 A1 | 9/2013 | Chesla et al. | |
| 2013/0268994 A1 | 10/2013 | Cooper et al. | |
| 2013/0275579 A1 | 10/2013 | Hernandez et al. | |
| 2013/0283374 A1 | 10/2013 | Zisapel et al. | |
| 2013/0290521 A1 | 10/2013 | Labovitz | |
| 2013/0297771 A1 | 11/2013 | Osterloh et al. | |
| 2013/0304900 A1 | 11/2013 | Trabelsi et al. | |
| 2013/0305369 A1 | 11/2013 | Karta et al. | |
| 2013/0318357 A1 | 11/2013 | Abraham et al. | |
| 2013/0326623 A1 | 12/2013 | Kruglick | |
| 2013/0333029 A1 | 12/2013 | Chesla et al. | |
| 2013/0347103 A1 | 12/2013 | Veteikis et al. | |
| 2014/0006610 A1 | 1/2014 | Formby et al. | |
| 2014/0006871 A1 | 1/2014 | Lakshmanan et al. | |
| 2014/0012814 A1 | 1/2014 | Bercovici et al. | |
| 2014/0033193 A1 | 1/2014 | Palaniappan | |
| 2014/0047185 A1 | 2/2014 | Peterson et al. | |
| 2014/0047372 A1 | 2/2014 | Gnezdov et al. | |
| 2014/0059200 A1 | 2/2014 | Nguyen et al. | |
| 2014/0089494 A1 | 3/2014 | Dasari et al. | |
| 2014/0096058 A1 | 4/2014 | Molesky et al. | |
| 2014/0115219 A1 | 4/2014 | Ajanovic et al. | |
| 2014/0143825 A1 | 5/2014 | Behrendt et al. | |
| 2014/0149490 A1 | 5/2014 | Luxenberg et al. | |
| 2014/0156814 A1 | 6/2014 | Barabash et al. | |
| 2014/0164607 A1 | 6/2014 | Bai et al. | |
| 2014/0173623 A1 | 6/2014 | Chang et al. | |
| 2014/0192639 A1 | 7/2014 | Smirnov | |
| 2014/0201717 A1* | 7/2014 | Mascaro | G06F 9/5066 717/125 |
| 2014/0215573 A1 | 7/2014 | Cepuran | |
| 2014/0215621 A1 | 7/2014 | Xaypanya et al. | |
| 2014/0281030 A1 | 9/2014 | Cui et al. | |
| 2014/0289854 A1 | 9/2014 | Mahvi | |
| 2014/0298461 A1 | 10/2014 | Hohndel et al. | |
| 2014/0317737 A1 | 10/2014 | Shin et al. | |
| 2014/0331276 A1 | 11/2014 | Frascadore et al. | |
| 2014/0331280 A1 | 11/2014 | Porras et al. | |
| 2014/0331304 A1 | 11/2014 | Wong | |
| 2014/0351203 A1 | 11/2014 | Kunnatur et al. | |
| 2014/0351415 A1 | 11/2014 | Harrigan et al. | |
| 2014/0359695 A1 | 12/2014 | Chari et al. | |
| 2015/0009840 A1 | 1/2015 | Pruthi et al. | |
| 2015/0033305 A1 | 1/2015 | Shear et al. | |
| 2015/0036533 A1 | 2/2015 | Sodhi et al. | |
| 2015/0039751 A1 | 2/2015 | Harrigan et al. | |
| 2015/0046882 A1 | 2/2015 | Menyhart et al. | |
| 2015/0058976 A1 | 2/2015 | Carney et al. | |
| 2015/0067143 A1 | 3/2015 | Babakhan et al. | |
| 2015/0082151 A1 | 3/2015 | Liang et al. | |
| 2015/0085665 A1 | 3/2015 | Kompella et al. | |
| 2015/0095332 A1 | 4/2015 | Beisiegel et al. | |
| 2015/0112933 A1 | 4/2015 | Satapathy | |
| 2015/0113133 A1 | 4/2015 | Srinivas et al. | |
| 2015/0124608 A1 | 5/2015 | Agarwal et al. | |
| 2015/0138993 A1 | 5/2015 | Forster et al. | |
| 2015/0142962 A1 | 5/2015 | Srinivas et al. | |
| 2015/0195291 A1 | 7/2015 | Zuk et al. | |
| 2015/0249622 A1 | 9/2015 | Phillips et al. | |
| 2015/0256555 A1 | 9/2015 | Choi et al. | |
| 2015/0261842 A1 | 9/2015 | Huang et al. | |
| 2015/0261886 A1 | 9/2015 | Wu et al. | |
| 2015/0271255 A1 | 9/2015 | Mackay et al. | |
| 2015/0295945 A1 | 10/2015 | Canzanese, Jr. et al. | |
| 2015/0347554 A1 | 12/2015 | Vasantham et al. | |
| 2015/0358352 A1 | 12/2015 | Chasin et al. | |
| 2016/0006753 A1 | 1/2016 | McDaid et al. | |
| 2016/0021131 A1 | 1/2016 | Heilig | |
| 2016/0026552 A1 | 1/2016 | Holden et al. | |
| 2016/0036837 A1 | 2/2016 | Jain et al. | |
| 2016/0050132 A1 | 2/2016 | Zhang et al. | |
| 2016/0072815 A1 | 3/2016 | Rieke et al. | |
| 2016/0103692 A1 | 4/2016 | Guntaka et al. | |
| 2016/0105350 A1 | 4/2016 | Greifeneder et al. | |
| 2016/0119234 A1 | 4/2016 | Valencia Lopez et al. | |
| 2016/0127395 A1 | 5/2016 | Underwood et al. | |
| 2016/0147585 A1 | 5/2016 | Konig et al. | |
| 2016/0162308 A1 | 6/2016 | Chen et al. | |
| 2016/0162312 A1 | 6/2016 | Doherty et al. | |
| 2016/0205002 A1 | 7/2016 | Rieke et al. | |
| 2016/0216994 A1 | 7/2016 | Sefidcon et al. | |
| 2016/0294691 A1 | 10/2016 | Joshi | |
| 2016/0308908 A1 | 10/2016 | Kirby et al. | |
| 2016/0357424 A1 | 12/2016 | Pang et al. | |
| 2016/0357546 A1 | 12/2016 | Chang et al. | |
| 2016/0357587 A1 | 12/2016 | Yadav et al. | |

(56) References Cited

U.S. PATENT DOCUMENTS

| | | |
|---|---|---|
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parasdehgheibi et al. |
| 2016/0359680 A1 | 12/2016 | Parasdehgheibi et al. |
| 2016/0359686 A1 | 12/2016 | Parasdehgheibi et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parasdehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parasdehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2017/0034018 A1 | 2/2017 | Parasdehgheibi et al. |
| 2018/0006911 A1 | 1/2018 | Dickey |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| EP | 0811942 | 12/1997 |
| EP | 1383261 | 1/2004 |
| EP | 1450511 | 8/2004 |
| EP | 2045974 | 4/2008 |
| EP | 2887595 | 6/2015 |
| JP | 2009-016906 | 1/2009 |
| KR | 1394338 | 5/2014 |
| WO | WO 2007/014314 | 2/2007 |
| WO | 2007070711 A2 | 6/2007 |
| WO | WO 2008/069439 | 6/2008 |
| WO | WO 2013/030830 | 3/2013 |
| WO | 2007042171 A1 | 3/2015 |
| WO | WO 2016/004075 | 1/2016 |
| WO | WO 2016/019523 | 2/2016 |

OTHER PUBLICATIONS

Australian Government Department of Defence, Intelligence and Security, "Top 4 Strategies to Mitigate Targeted Cyber Intrusions," Cyber Security Operations Centre Jul. 2013, http://www.asd.gov.au/infosec/top-mitigations/top-4-strategies-explained.htm.

Author Unknown, "Blacklists & Dynamic Reputation: Understanding Why the Evolving Threat Eludes Blacklists," www.dambala.com, 9 pages, Dambala, Atlanta, GA, USA.

Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.

Backes, Michael, et al., "Data Lineage in Malicious Environments," IEEE 2015, pp. 1-13.

Bayati, Mohsen, et al., "Message-Passing Algorithms for Sparse Network Alignment," Mar. 2013, 31 pages.

Berezinski, Przemyslaw, et al., "An Entropy-Based Network Anomaly Detection Method," Entropy, 2015, vol. 17, www.mdpi.com/journal/entropy, pp. 2367-2408.

Berthier, Robin, et al. "Nfsight: Netflow-based Network Awareness Tool," 2010, 16 pages.

Bhuyan, Dhiraj, "Fighting Bots and Botnets," 2006, pp. 23-28.

Blair, Dana, et al., U.S. Appl. No. 62/106,006, tiled Jan. 21, 2015, entitled "Monitoring Network Policy Compliance."

Chandran, Midhun, et al., "Monitoring in a Virtualized Environment," GSTF International Journal on Computing, vol. 1, No. 1, Aug. 2010.

Chari, Suresh, et al., "Ensuring continuous compliance through reconciling policy with usage," Proceedings of the 18$^{th}$ ACM symposium on Access control models and technologies (SACMAT '13). ACM, New York, NY, USA, 49-60.

Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.

Cisco Systems, "Cisco Network Analysis Modules (NAM) Tutorial," Cisco Systems, Inc., Version 3.5.

Cisco Systems, Inc., "Addressing Compliance from One Infrastructure: Cisco Unified Compliance Solution Framework," 2014.

Cisco Systems, Inc., "Cisco Application Dependency Mapping Service," 2009.

Cisco Systems, Inc., "White Paper—New Cisco Technologies Help Customers Achieve Regulatory Compliance," 1992-2008.

Cisco Systems, Inc., "A Cisco Guide to Defending Against Distributed Denial of Service Attacks," May 3, 2016, 34 pages.

Cisco Technology, Inc., "Cisco Lock-and-Key:Dynamic Access Lists," http://www/cisco.com/c/en/us/support/docs/security-vpn/lock-key/7604-13.html; Updated Jul. 12, 2006, 16 pages.

Feinstein, Laura, et al., "Statistical Approaches to DDoS Attack Detection and Response," Proceedings of the DARPA Information Survivability Conference and Exposition (DISCEX '03), Apr. 2003, 12 pages.

George, Ashley, et al., "NetPal: A Dynamic Network Administration Knowledge Base," 2008, pp. 1-14.

Goldsteen, Abigail, et al., "A Tool for Monitoring and Maintaining System Trustworthiness at Run Time," REFSQ (2015), pp. 142-147.

Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.

Hewlett-Packard, "Effective use of reputation intelligence in a security operations center," Jul. 2013, 6 pages.

Hideshima, Yusuke, et al., "STARMINE: A Visualization System for Cyber Attacks," https://www.researchgate.net/publication/221536306, Feb. 2006, 9 pages.

InternetPerils, Inc., "Control Your Internet Business Risk," 2003-2015, https://www.internetperils.com.

Janoff, Christian, et al., "Cisco Compliance Solution for HIPAA Security Rule Design and Implementation Guide," Cisco Systems, Inc., Updated Nov. 14, 2015, part 1 of 2, 350 pages.

Janoff, Christian, et al., "Cisco Compliance Solution for HIPAA Security Rule Design and Implementation Guide," Cisco Systems, Inc., Updated Nov. 14, 2015, part 2 of 2, 588 pages.

Kerrison, Adam, et al., "Four Steps to Faster, Better Application Dependency Mapping—Laying the Foundation for Effective Business Service Models," BMCSoftware, 2011.

(56) References Cited

OTHER PUBLICATIONS

Kraemer, Brian, "Get to know your data center with CMDB," TechTarget, Apr. 5, 2006, http://searchdatacenter.techtarget.com/news/118820/Get-to-know-your-data-center-with-CMDB.
Lab SKU, "VMware Hands-on Labs—HOL-SDC-1301" Version: 20140321-160709, 2013; http://docs.hol.vmware.com/HOL-2013/holsdc-1301_html_en/ (part 1 of 2).
Lab SKU, "VMware Hands-on Labs—HOL-SDC-1301" Version: 20140321-160709, 2013; http://docs.hol.vmware.com/HOL-2013/holsdc-1301_html_en/ (part 2 of 2).
Lachance, Michael, "Dirty Little Secrets of Application Dependency Mapping," Dec. 26, 2007.
Lee, Sihyung, "Reducing Complexity of Large-Scale Network Configuration Management," Ph.D. Dissertation, Carniege Mellon University, 2010.
Li, Ang, et al., "Fast Anomaly Detection for Large Data Centers," Global Telecommunications Conference (GLOBECOM 2010, Dec. 2010, 6 pages.
Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.
Liu, Ting, et al., "Impala: A Middleware System for Managing Autonomic, Parallel Sensor Systems," In Proceedings of the Ninth ACM SIGPLAN Symposium on Principles and Practice of Parallel Programming(PPoPP '03), ACM, New York, NY, USA, Jun. 11-13, 2003, pp. 107-118.
Lu, Zhonghai, et al., "Cluster-based Simulated Annealing for Mapping Cores onto 2D Mesh Networks on Chip," Design and Diagnostics of Electronic Circuits and Systems, pp. 1, 6, Apr. 16-18, 2008.
Matteson, Ryan, "Depmap: Dependency Mapping of Applications Using Operating System Events: a Thesis," Master's Thesis, California Polytechnic State University, Dec. 2010.
Natarajan, Arun, et al., "NSDMiner: Automated Discovery of Network Service Dependencies," Institute of Electrical and Electronics Engineers INFOCOM, Feb. 2012, 9 pages.
Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.
Nilsson, Dennis K., et al., "Key Management and Secure Software Updates in Wireless Process Control Environments," In Proceedings of the First ACM Conference on Wireless Network Security (WiSec '08), ACM, New York, NY, USA, Mar. 31-Apr. 2, 2008, pp. 100-108.
Nunnally, Troy, et al., "P3D: A Parallel 3D Coordinate Visualization for Advanced Network Scans," IEEE 2013, Jun. 9-13, 2013, 6 pages.
O'Donnell, Glenn, et al., "The CMDB Imperative: How to Realize the Dream and Avoid the Nightmares," Prentice Hall, Feb. 19, 2009.
Ohta, Kohei, et al., "Detection, Defense, and Tracking of Internet-Wide Illegal Access in a Distributed Manner," 2000, pp. 1-16.
Pathway Systems International Inc., "How Blueprints does Integration," Apr. 15, 2014, 9 pages, http://pathwaysystems.com/company-blog/.
Pathway Systems International Inc., "What is Blueprints?" 2010-2016, http://pathwaysystems.com/blueprints-about/.
Popa, Lucian, et al., "Macroscope: End-Point Approach to Networked Application Dependency Discovery," CoNEXT'09, Dec. 1-4, 2009, Rome, Italy, 12 pages.
Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.
Sachan, Mrinmaya, et al., "Solving Electrical Networks to incorporate Supervision in Random Walks," May 13-17, 2013, pp. 109-110.
Sammarco, Matteo, et al., "Trace Selection for Improved WLAN Monitoring," Aug. 16, 2013, pp. 9-14.
Shneiderman, Ben, et al., "Network Visualization by Semantic Substrates," Visualization and Computer Graphics, vol. 12, No. 5, pp. 733,740, Sep.-Oct. 2006.
Wang, Ru, et al., "Learning directed acyclic graphs via bootstarp aggregating," 2014, 47 pages, http://arxiv.org/abs/1406.2098.
Wang, Yongjun, et al., "A Network Gene-Based Framework for Detecting Advanced Persistent Threats," Nov. 2014, 7 pages.
Woodberg, Brad, "Snippet from Juniper SRX Series" Jun. 17, 2013, 1 page, O'Reilly Media, Inc.
Zhang, Yue, et al., "CANTINA: A Content-Based Approach to Detecting Phishing Web Sites," May 8-12, 2007, pp. 639-648.
Bosch, Greg, "Virtualization," 2010, 33 pages.
Breen, Christopher, "MAC 911, How to dismiss Mac App Store Notifications," Macworld.com, Mar. 24, 2014, 3 pages.
Chou, C.W., et al., "Optical Clocks and Relativity," Science vol. 329, Sep. 24, 2010, pp. 1630-1633.
Huang, Hing-Jie, et al., "Clock Skew Based Node Identification in Wireless Sensor Networks," IEEE, 2008, 5 pages.
Ives, Herbert, E., et al., "An Experimental Study of the Rate of a Moving Atomic Clock," Journal of the Optical Society of America, vol. 28, No. 7, Jul. 1938, pp. 215-226.
Witze, Alexandra, "Special relativity aces time trial, 'Time dilation' predicted by Einstein confirmed by lithium ion experiment," Nature, Sep. 19, 2014, 3 pages.
Zatrochova, Zuzana, "Analysis and Testing of Distributed NoSQL Datastore Riak," Spring, 2015, 76 pages.
JFrog, "Dependency Analyzer," Feb. 14, 2008, http://www.jfrog.com/confluence/display/DA/Home.
Neverfail, "Neverfail IT Continuity Architect," 2015, https://web.archive.org/web/20150908090456/http://www.neverfailgroup.com/products/it-continuity-architect.
Di Lorenzo, G. et al., "EXSED: An Intelligent Tool for Exploration of Social Events Dynamics from Augmented Trajectories," Mobile Data Management (MDM), 2013 IEEE 14th International Conference on , vol. 1, No., pp. 323,330, Jun. 3-6, 2013.
Bauch, Petr, "Reader's Report of Master's Thesis, Analysis and Testing of Distributed NoSQL Datastore Riak," May 28, 2015, Brno. 2 pages.
Heckman, Sarah, et al., "On Establishing a Benchmark for Evaluating Static Analysis Alert Prioritization and Classification Techniques," IEEE, 2008; 10 pages.
Kim, Myung-Sup, et al. "A Flow-based Method for Abnormal Network Traffic Detection, " IEEE, 2004, pp. 599-612.
Thomas, R., "Bogon Dotted Decimal List," Version 7.0, Team Cymru NOC, Apr. 27, 2012, 5 pages.

* cited by examiner

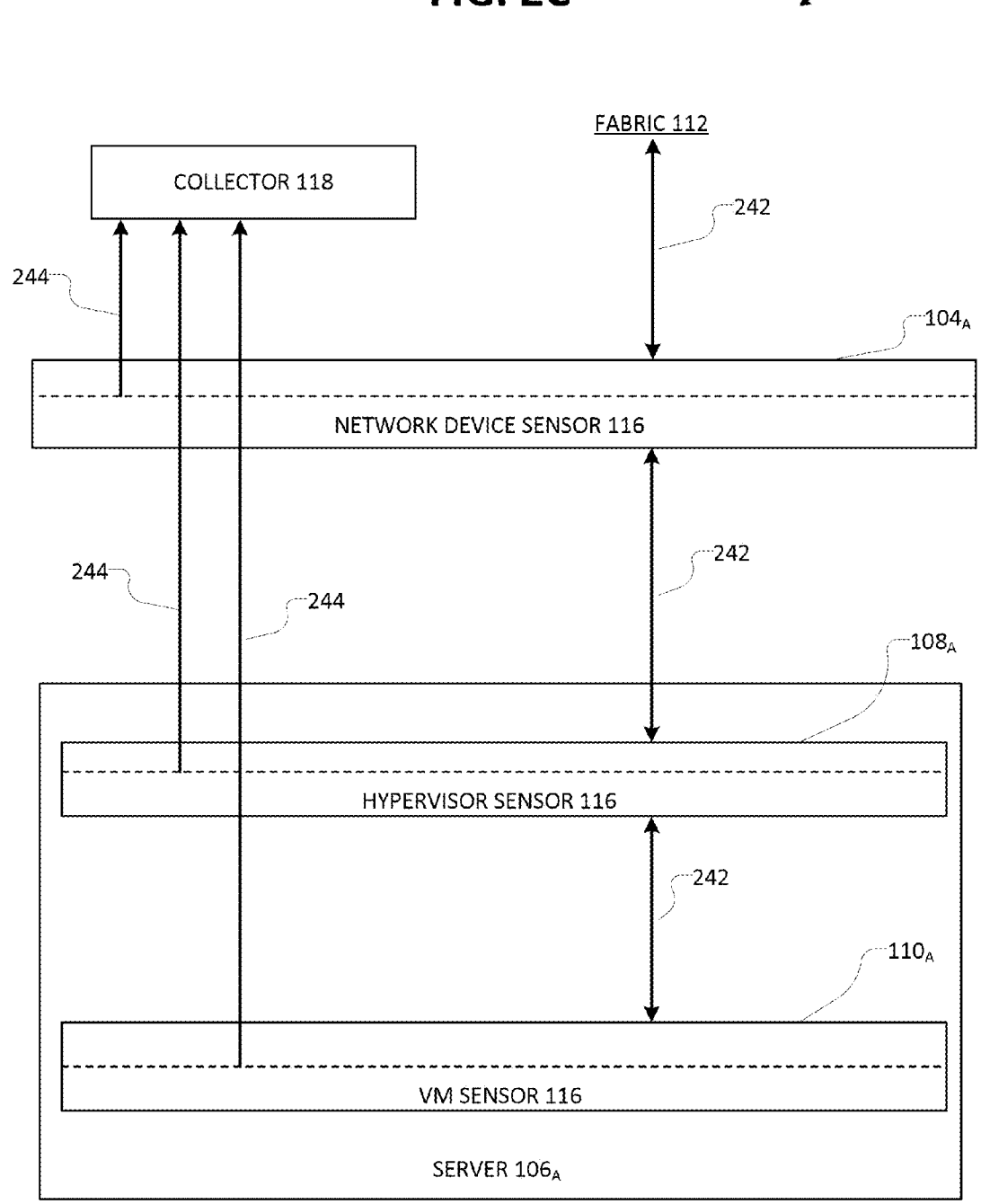

INTERACTIVE HIERARCHICAL NETWORK CHORD DIAGRAM FOR APPLICATION DEPENDENCY MAPPING

RELATED APPLICATIONS

This application claims priority to U.S. Provisional Application No. 62/171,899, entitled "SYSTEM FOR MONITORING AND MANAGING DATACENTERS," filed Jun. 5, 2015, which is incorporated herein by reference in its entirety.

TECHNICAL FIELD

The present technology pertains network analytics, and more specifically to the visualization of data flows between logical entities.

BACKGROUND

Datacenters can include a large number of servers and virtual machines. As such datacenters can have a large number of data flows between each server and virtual machine. Monitoring and managing the network of a datacenter can be cumbersome especially with a datacenter with a large number of servers, virtual machines and data flows. Visualizing the network of a datacenter can help network operators manage and monitor the network of a datacenter. However, because of the large number of data flows, visualizing these data flows can be very cumbersome.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 2C illustrates a schematic diagram of an example reporting system for implementing various embodiments of the present technology;

DESCRIPTION OF EXAMPLE EMBODIMENTS

Overview

The present disclosure provides a mechanism for visualizing data flows within a datacenter in an interactive hierarchical network chord diagram. In some embodiments a dataflow monitoring system analyzes data describing data flows. Based on the analyzed data describing data flows, the dataflow monitoring system groups a portion of the data flows that originate at the same first endpoint and terminate at the same second endpoint. Subsequently, the dataflow monitoring system displays an interactive hierarchical network chord diagram to include a chord with a first endpoint and a second endpoint. The chord represents the grouped portion of data flows that originate at the same first endpoint and terminate at the same second endpoint. Upon receiving a selection of the chord or the first endpoint of the chord, the dataflow monitoring system expands the grouped portion of the data flows into sub-groupings of data flows and the first endpoint into a set of sub-endpoints. After which, the dataflow monitoring system updates the displayed interactive chord diagram to include the expanded chord and an expanded first endpoint.

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology is directed to the visualization of data flows within a datacenter. Specifically, to the generation and presentation of an interactive hierarchical network chord diagram (or network chord diagram) to represent analyzed data describing data flows within a datacenter. Additionally, the network chord diagram can visualize the data flows of a datacenter at different levels of abstraction. For example, at the lowest level of abstraction, data flows can be visualized according to the dataflow's individual sending and receiving hosts. At a higher level of abstraction, the data flows can be further grouped by clusters of hosts. As such, the network chord diagram can visualize the grouped data flows by their sending and receiving clusters of hosts. At even higher level of abstraction, the data flows can be further grouped together by common subnets of each cluster of hosts. As such, the network chord diagram can visualize the grouped data flows by their sending and receiving subnets. By allowing the user to visualize the data flows of a data center at different levels of abstraction, the user can more easily consume visualization of the data flows.

Figure 1:
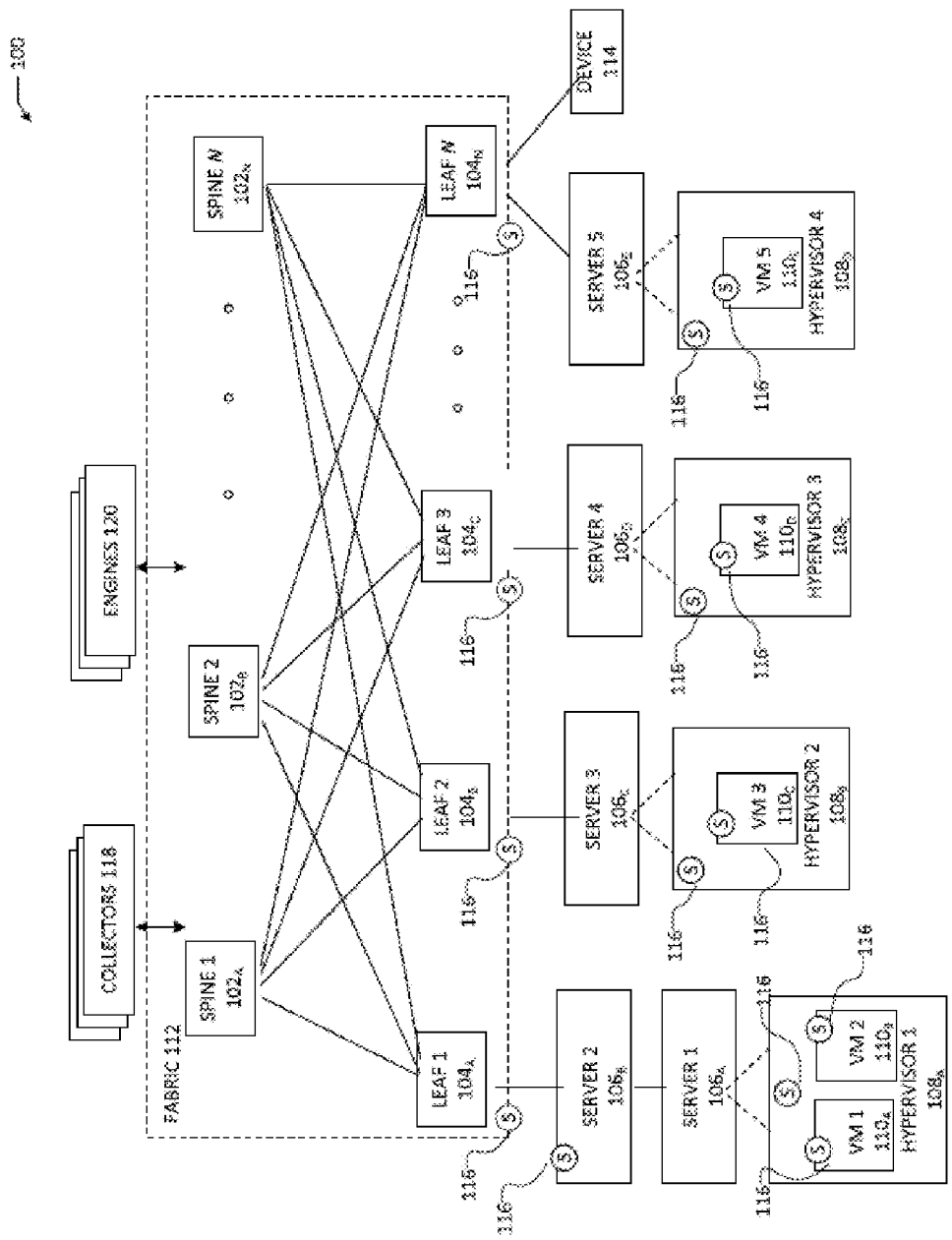
FIG. 1 illustrates a diagram of an example network environment for implementing various embodiments of the present technology.

FIG. 1 illustrates a diagram of an example network environment 100. Fabric 112 can represent the underlay (i.e., physical network) of network environment 100. Fabric 112 can include spine routers 1-N ($102_{A-N}$) (collectively "102") and leaf routers 1-N ($104_{A-N}$) (collectively "104"). Leaf routers 104 can reside at the edge of fabric 112, and can thus represent the physical network edge. Leaf routers 104 can be, for example, top-of-rack ("ToR") switches, aggregation switches, gateways, ingress and/or egress switches, provider edge devices, and/or any other type of routing or switching device.

Leaf routers 104 can be responsible for routing and/or bridging tenant or endpoint packets and applying network policies. Spine routers 102 can perform switching and routing within fabric 112. Thus, network connectivity in fabric 112 can flow from the spine routers 102 to leaf routers 104, and vice versa.

Leaf routers 104 can provide servers 1-5 ($106_{A-E}$) (collectively "106"), hypervisors 1-4 ($108_A$-$108_D$) (collectively "108"), and virtual machines (VMs) 1-5 ($110_A$-$110_E$) (collectively "110") access to fabric 112. For example, leaf routers 104 can encapsulate and decapsulate packets to and from servers 106 in order to enable communications throughout environment 100. Leaf routers 104 can also connect other devices, such as device 114, with fabric 112. Device 114 can be any network-capable device(s) or network(s), such as a firewall, a database, a server, a collector 118 (further described below), an engine 120 (further described below), etc. Leaf routers 104 can also provide any other servers, resources, endpoints, external networks, VMs, services, tenants, or workloads with access to fabric 112.

VMs 110 can be virtual machines hosted by hypervisors 108 running on servers 106. VMs 110 can include workloads running on a guest operating system on a respective server. Hypervisors 108 can provide a layer of software, firmware, and/or hardware that creates and runs the VMs 110. Hypervisors 108 can allow VMs 110 to share hardware resources on servers 106, and the hardware resources on servers 106 to appear as multiple, separate hardware platforms. Moreover, hypervisors 108 and servers 106 can host one or more VMs 110. For example, server $106_A$ and hypervisor $108_A$ can host VMs $110_{A-B}$.

In some cases, VMs 110 and/or hypervisors 108 can be migrated to other servers 106. For example, VM $110_A$ can be migrated to server $106_C$ and hypervisor $108_B$. Servers 106 can similarly be migrated to other locations in network environment 100. For example, a server connected to a specific leaf router can be changed to connect to a different or additional leaf router. In some cases, some or all of the servers 106, hypervisors 108, and/or VMs 110 can represent tenant space. Tenant space can include workloads, services, applications, devices, and/or resources that are associated with one or more clients or subscribers. Accordingly, traffic in the network environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants.

Any of leaf routers 104, servers 106, hypervisors 108, and VMs 110 can include a sensor 116 configured to capture network data, and report any portion of the captured data to collector 118. Sensors 116 can be processes, agents, modules, drivers, or components deployed on a respective system (e.g., a server, VM, hypervisor, leaf router, etc.), configured to capture network data for the respective system (e.g., data received or transmitted by the respective system), and report some or all of the captured data to collector 118.

For example, a VM sensor can run as a process, kernel module, or kernel driver on the guest operating system installed in a VM and configured to capture data (e.g., network and/or system data) processed (e.g., sent, received, generated, etc.) by the VM. A hypervisor sensor can run as a process, kernel module, or kernel driver on the host operating system installed at the hypervisor layer and configured to capture data (e.g., network and/or system data) processed (e.g., sent, received, generated, etc.) by the hypervisor. A server sensor can run as a process, kernel module, or kernel driver on the host operating system of a server and configured to capture data (e.g., network and/or system data) processed (e.g., sent, received, generated, etc.) by the server. And a network device sensor can run as a process or component in a network device, such as leaf routers 104, and configured to capture data (e.g., network and/or system data) processed (e.g., sent, received, generated, etc.) by the network device.

Sensors 116 can be configured to report data and/or metadata about one or more packets, flows, communications, processes, events, and/or activities observed to collector 118. For example, sensors 116 can capture network data as well as information about the system or host of the sensors 116 (e.g., where the sensors 116 are deployed). Such information can also include, for example, data or metadata of active or previously active processes of the system, metadata of files on the system, system alerts, networking information, etc. Reported data from sensors 116 can provide details or statistics particular to one or more tenants. For example, reported data from a subset of sensors 116 deployed throughout devices or elements in a tenant space can provide information about the performance, use, quality, events, processes, security status, characteristics, statistics, patterns, conditions, configurations, topology, and/or any other information for the particular tenant space.

Additionally, the reports of sensors 116 can include timestamps associated with captured network traffic received, transmitted or generated by the host/node (e.g. VM, hypervisor, server, and leaf router). Sensors 116 can also associate a timestamp indicating when sensors 116 send the reports to collectors 118. Regardless, the timestamps can be based on the clock of the host (e.g., server, switch, VM, hypervisor, etc.) of where the sensor resides. For example, timestamps associated with sensors 116 residing on hypervisor 2 $108_B$ can be based on the clock of hypervisor 2 $108_B$. Furthermore, since multiple sensors 116 can reside on the same host, the reports of the multiple sensors 116 can be based on a same clock associated with the host or multiple clocks associated with the host. Collectors 118 can be one or more devices, modules, workloads and/or processes capable of receiving data from sensors 116. Collectors 118 can thus collect reports and data from sensors 116. Collectors 118 can be deployed anywhere in network environment 100 and/or even on remote networks capable of communicating with network environment 100. For example, one or more collectors can be deployed within fabric 112 or on one or more of the servers 106. One or more collectors can be deployed outside of fabric 112 but connected to one or more leaf routers 104. Collectors 118 can be part of servers 106 and/or separate servers or devices (e.g., device 114). Collectors 118 can also be implemented in a cluster of servers.

Collectors 118 can be configured to collect data from sensors 116. In addition, collectors 118 can be implemented in one or more servers. As previously noted, collectors 118 can include one or more collectors. Moreover, each collector can be configured to receive reported data from all sensors 116 or a subset of sensors 116. For example, a collector can be assigned to a subset of sensors 116 so the data received by that specific collector is limited to data from the subset of sensors.

Collectors 118 can be configured to aggregate data from all sensors 116 and/or a subset of sensors 116. Moreover, collectors 118 can be configured to analyze some or all of the data reported by sensors 116. For example, collectors 118 can include analytics engines (e.g., engines 120) for analyzing collected data. Environment 100 can also include separate analytics engines 120 configured to analyze the data reported to collectors 118. For example, engines 120 can be configured to receive collected data from collectors 118 and aggregate the data, analyze the data (individually and/or aggregated), generate reports, identify conditions, compute statistics, visualize reported data, troubleshoot conditions, visualize the network and/or portions of the network (e.g., a tenant space), generate alerts, identify patterns, calculate misconfigurations, identify errors, generate suggestions, generate testing, and/or any other analytics functions.

While collectors 118 and engines 120 are shown as separate entities, this is for illustration purposes as other configurations are also contemplated herein. For example, any of collectors 118 and engines 120 can be part of a same or separate entity. Moreover, any of the collector, aggregation, and analytics functions can be implemented by one entity (e.g., collectors 118) or separately implemented by multiple entities (e.g., engine 120 and/or collectors 118).

Each of the sensors 116 can use a respective address (e.g., internet protocol (IP) address, port number, etc.) of their host to send information to collectors 118 and/or any other destination. Moreover, sensors 116 can periodically send information about flows they observe to collectors 118. Sensors 116 can be configured to report each and every flow they observe. Sensors 116 can report a list of flows that were active during a period of time (e.g., between the current time and the time of the last report). The communication channel between a sensor and collector 118 can also create a flow in every reporting interval. Thus, the information transmitted or reported by sensors 116 can also include information about the flow created by the communication channel.

Figure 2A:
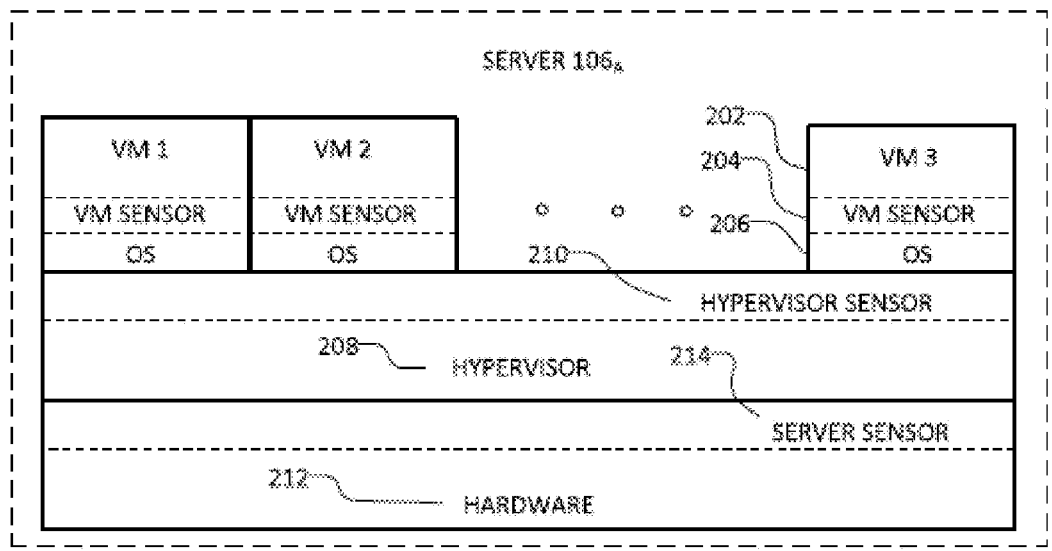
FIG. 2A illustrates a schematic diagram of an example sensor deployment in a virtualized environment.

FIG. 2A illustrates a schematic diagram of an example sensor deployment 260 in a virtualized environment. Server 106$_A$ can run and host one or more VMs 202. VMs 202 can be configured to run workloads (e.g., applications, services, processes, functions, etc.) based on hardware resources 212 on server 106$_A$. VMs 202 can run on guest operating systems 206 on a virtual operating platform provided by hypervisor 208. Each VM can run a respective guest operating system which can be the same or different as other guest operating systems associated with other VMs on server 106$_A$. Moreover, each VM can have one or more network addresses, such as an internet protocol (IP) address. VMs 202 can thus communicate with hypervisor 208, server 106$_A$, and/or any remote devices or networks using the one or more network addresses.

Hypervisor 208 can be a layer of software, firmware, and/or hardware that creates and runs VMs 202. The guest operating systems running on VMs 202 can share virtualized hardware resources created by hypervisor 208. The virtualized hardware resources can provide the illusion of separate hardware components. Moreover, the virtualized hardware resources can perform as physical hardware components (e.g., memory, storage, processor, network interface, etc.), and can be driven by hardware resources 212 on server 106$_A$. Hypervisor 208 can have one or more network addresses, such as an internet protocol (IP) address, to communicate with other devices, components, or networks. For example, hypervisor 208 can have a dedicated IP address which it can use to communicate with VMs 202, server 106$_A$, and/or any remote devices or networks.

Hardware resources 212 of server 106$_A$ can provide the underlying physical hardware driving operations and functionalities provided by server 106$_A$, hypervisor 208, and VMs 202. Hardware resources 212 can include, for example, one or more memory resources, one or more storage resources, one or more communication interfaces, one or more processors, one or more circuit boards, one or more extension cards, one or more power supplies, one or more antennas, one or more peripheral components, etc. Additional examples of hardware resources are described below with reference to FIGS. 6 and 7.

Server 106$_A$ can also include one or more host operating systems. The number of host operating system can vary by configuration. For example, some configurations can include a dual boot configuration that allows server 106$_A$ to boot into one of multiple host operating systems. In other configurations, server 106$_A$ may run a single host operating system. Host operating systems can run on hardware resources 212. In some cases, hypervisor 208 can run on, or utilize, a host operating system on server 106$_A$.

Server 106$_A$ can also have one or more network addresses, such as an internet protocol (IP) address, to communicate with other devices, components, or networks. For example, server 106$_A$ can have an IP address assigned to a communications interface from hardware resources 212, which it can use to communicate with VMs 202, hypervisor 208, leaf router 104$_A$ in FIG. 1, collectors 118 in FIG. 1, and/or any remote devices or networks.

VM sensors 204 can be deployed on one or more of the VMs 202. VM sensors 204 can be data and packet inspection agents deployed on the VMs 202 to capture packets, flows, processes, events, traffic, and/or any data flowing through the VMs 202. VM sensors 204 can be configured to export or report any data collected or captured by the sensors 204 to a remote entity, such as collectors 118, for example. VM sensors 204 can communicate or report such data using a network address of the respective VMs 202 (e.g., VM IP address).

VM sensors 204 can capture and report any traffic (e.g., packets, flows, etc.) sent, received, generated, and/or processed by VMs 202. For example, sensors 204 can report every packet or flow of communication sent and received by VMs 202. Moreover, any communication sent or received by VMs 202, including data reported from sensors 204, can create a network flow. VM sensors 204 can report such flows to a remote device, such as collectors 118 illustrated in FIG. 1. VM sensors 204 can report each flow separately or aggregated with other flows. When reporting a flow, VM sensors 204 can include a sensor identifier that identifies sensors 204 as reporting the associated flow. VM sensors 204 can also include a flow identifier, an IP address, a timestamp, metadata, a process ID, and any other information, as further described below.

VM sensors 204 can also report multiple flows as a set of flows. When reporting a set of flows, VM sensors 204 can include a flow identifier for the set of flows and/or a flow identifier for each flow in the set of flows. VM sensors 204 can also include one or more timestamps and other information as previously explained.

VM sensors 204 can run as a process, kernel module, or kernel driver on the guest operating systems 206 of VMs 202. VM sensors 204 can thus monitor any traffic sent and received by VMs 202, any processes running on the guest operating systems 206, any workloads on VMs 202, etc.

Hypervisor sensor 210 can be deployed on hypervisor 208. Hypervisor sensor 210 can be a data inspection agent deployed on hypervisor 208 to capture traffic (e.g., packets, flows, etc.) and/or data flowing through hypervisor 208. Hypervisor sensor 210 can be configured to export or report any data collected or captured by hypervisor sensor 210 to a remote entity, such as collectors 118, for example. Hypervisor sensor 210 can communicate or report such data using a network address of hypervisor 208, such as an IP address of hypervisor 208.

Because hypervisor 208 can see traffic and data from VMs 202, hypervisor sensor 210 can also capture and report any data (e.g., traffic data) associated with VMs 202. For example, hypervisor sensor 210 can report every packet or flow of communication sent or received by VMs 202 and/or VM sensors 204. Moreover, any communication sent or received by hypervisor 208, including data reported from hypervisor sensor 210, can create a network flow. Hypervisor sensor 210 can report such flows to a remote device, such as collectors 118 illustrated in FIG. 1. Hypervisor sensor 210 can report each flow separately and/or in combination with other flows or data. When reporting a flow, hypervisor sensor 210 can include a sensor identifier that identifies hypervisor sensor 210 as reporting the flow. Hypervisor sensor 210 can also include a flow identifier, an IP address, a timestamp, metadata, a process ID, and any other information, as explained below.

Hypervisor sensor 210 can also report multiple flows as a set of flows. When reporting a set of flows, hypervisor sensor 210 can include a flow identifier for the set of flows and/or a flow identifier for each flow in the set of flows. Hypervisor sensor 210 can also include one or more timestamps and other information as previously explained.

As previously explained, any communication captured or reported by VM sensors 204 can flow through hypervisor 208. Thus, hypervisor sensor 210 can observe and capture any flows or packets reported by VM sensors 204. Accordingly, hypervisor sensor 210 can also report any packets or flows reported by VM sensors 204. For example, VM sensor A on VM A captures flow 1 (F1) and reports F1 to collector 118 on FIG. 1. Hypervisor sensor 210 on hypervisor 208 can also see and capture F1, as F1 would traverse hypervisor 208 when being sent or received by VM A. Accordingly, hypervisor sensor 210 on hypervisor 208 can also report F1 to collector 118. Thus, collector 118 can receive a report of F1 from VM sensor A on VM A and another report of F1 from hypervisor sensor 210 on hypervisor 208.

When reporting F1, hypervisor sensor 210 can report F1 as a message or a separate from the message or report of F1 transmitted by VM sensor A on VM A. However, hypervisor sensor 210 can also, or otherwise, report F1 as a message or report that includes or appends the message or report of F1 transmitted by VM sensor A on VM A. In other words, hypervisor sensor 210 can report F1 as a separate message or report from VM sensor A's message or report of F1, and/or a same message or report that includes both a report of F1 by hypervisor sensor 210 and the report of F1 by VM sensor A at VM A. In this way, VM sensors 204 at VMs 202 can report packets or flows received or sent by VMs 202, and hypervisor sensor 210 at hypervisor 208 can report packets or flows received or sent by hypervisor 208, including any flows or packets received or sent by VMs 202 and/or reported by VM sensors 204.

Hypervisor sensor 210 can run as a process, kernel module, or kernel driver on the host operating system associated with hypervisor 208. Hypervisor sensor 210 can thus monitor any traffic sent and received by hypervisor 208, any processes associated with hypervisor 208, etc.

Server 106$_A$ can also have a server sensor 214 running on it. Server sensor 214 can be a data inspection agent deployed on server 106$_A$ to capture data (e.g., packets, flows, traffic data, etc.) on server 106$_A$. Server sensor 214 can be configured to export or report any data collected or captured by server sensor 214 to a remote entity, such as collector 118, for example. Server sensor 214 can communicate or report such data using a network address of server 106$_A$, such as an IP address of server 106$_A$.

Server sensor 214 can capture and report any packet or flow of communication associated with server 106$_A$. For example, sensor 216 can report every packet or flow of communication sent or received by one or more communication interfaces of server 106$_A$. Moreover, any communication sent or received by server 106$_A$, including data reported from sensors 204 and 210, can create a network flow. Server sensor 214 can report such flows to a remote device, such as collector 118 illustrated in FIG. 1. Server sensor 214 can report each flow separately or in combination. When reporting a flow, server sensor 214 can include a sensor identifier that identifies server sensor 214 as reporting the associated flow. Server sensor 214 can also include a flow identifier, an IP address, a timestamp, metadata, a process ID, and any other information.

Server sensor 214 can also report multiple flows as a set of flows. When reporting a set of flows, server sensor 214 can include a flow identifier for the set of flows and/or a flow identifier for each flow in the set of flows. Server sensor 214 can also include one or more timestamps and other information as previously explained.

Any communications capture or reported by sensors 204 and 210 can flow through server 106$_A$. Thus, server sensor 214 can observe or capture any flows or packets reported by sensors 204 and 210. In other words, network data observed by sensors 204 and 210 inside VMs 202 and hypervisor 208 can be a subset of the data observed by server sensor 214 on server 106$_A$. Accordingly, server sensor 214 can report any packets or flows reported by sensors 204 and 210. For example, sensor A on VM A captures flow 1 (F1) and reports F1 to collector 118 on FIG. 1. Sensor 210 on hypervisor 208 can also see and capture F1, as F1 would traverse hypervisor 208 when being sent or received by VM A. In addition, sensor 214 on server 106$_A$ can also see and capture F1, as F1 would traverse server 106$_A$ when being sent or received by VM A and hypervisor 208. Accordingly, sensor 216 can also report F1 to collector 118. Thus, collector 118 can receive a report of F1 from sensor A on VM A, sensor 210 on hypervisor 208, and sensor 214 on server 106$_A$.

When reporting F1, server sensor 214 can report F1 as a message or report that is separate from any messages or reports of F1 transmitted by sensor A on VM A or sensor 210 on hypervisor 208. However, server sensor 214 can also, or otherwise, report F1 as a message or report that includes or appends the messages or reports or metadata of F1 transmitted by sensor A on VM A and sensor 210 on hypervisor 208. In other words, server sensor 214 can report F1 as a separate message or report from the messages or reports of F1 from sensor A and sensor 210, and/or a same message or report that includes a report of F1 by sensor A, sensor 210, and sensor 214. In this way, sensors 204 at VMs 202 can report packets or flows received or sent by VMs 202, sensor 210 at hypervisor 208 can report packets or flows received or sent by hypervisor 208, including any flows or packets received or sent by VMs 202 and reported by sensors 204, and sensor 214 at server 106$_A$ can report packets or flows received or sent by server 106$_A$, including any flows or packets received or sent by VMs 202 and reported by sensors 204, and any flows or packets received or sent by hypervisor 208 and reported by sensor 210.

Server sensor 214 can run as a process, kernel module, or kernel driver on the host operating system or a component of server 106$_A$. Server sensor 214 can thus monitor any traffic sent and received by server 106$_A$, any processes associated with server 106$_A$, etc.

In addition to network data, sensors 204, 210, and 214 can capture additional information about the system or environment in which they reside. For example, sensors 204, 210, and 214 can capture data or metadata of active or previously active processes of their respective system or environment, metadata of files on their respective system or environment, timestamps, network addressing information, flow identifiers, sensor identifiers, etc. Moreover, sensors 204, 210, 214 are not specific to any operating system environment, hypervisor environment, network environment, or hardware environment. Thus, sensors 204, 210, and 214 can operate in any environment.

As previously explained, sensors 204, 210, and 214 can send information about the network traffic they observe. This information can be sent to one or more remote devices, such as one or more servers, collectors, engines, etc. Each sensor can be configured to send respective information using a network address, such as an IP address, and any other communication details, such as port number, to one or more destination addresses or locations. Sensors 204, 210, and 214 can send metadata about one or more flows, packets, communications, processes, events, etc.

Sensors 204, 210, and 214 can periodically report information about each flow or packet they observe. The information reported can contain a list of flows or packets that were active during a period of time (e.g., between the current time and the time at which the last information was reported). The communication channel between the sensor and the destination can create a flow in every interval. For example, the communication channel between sensor 210 and collector 118 can create a control flow. Thus, the information reported by a sensor can also contain information about this control flow. For example, the information reported by sensor 210 to collector 118 can include a list of flows or packets that were active at hypervisor 208 during a period of time, as well as information about the communication channel between sensor 210 and collector 118 used to report the information by sensor 210.

The report(s) of sensors 204, 210, and 214 can include timestamps associated with captured network traffic received, transmitted or generated by the host/node (e.g. VM 3 202, hypervisor 208 and server 106$_A$). Sensors 204, 210, and 214 can also associate a timestamp indicating when each respective sensor 204, 210, and 214 transmits its respective report(s) to the remote device, such as collectors 118 illustrated in FIG. 1. Regardless, the timestamps associated by sensors 204, 210, and 214 can be based on the clock of the host/node (e.g. VM 3 202, hypervisor 208 and server 106$_A$) where each respective sensor resides.

Figure 2B:
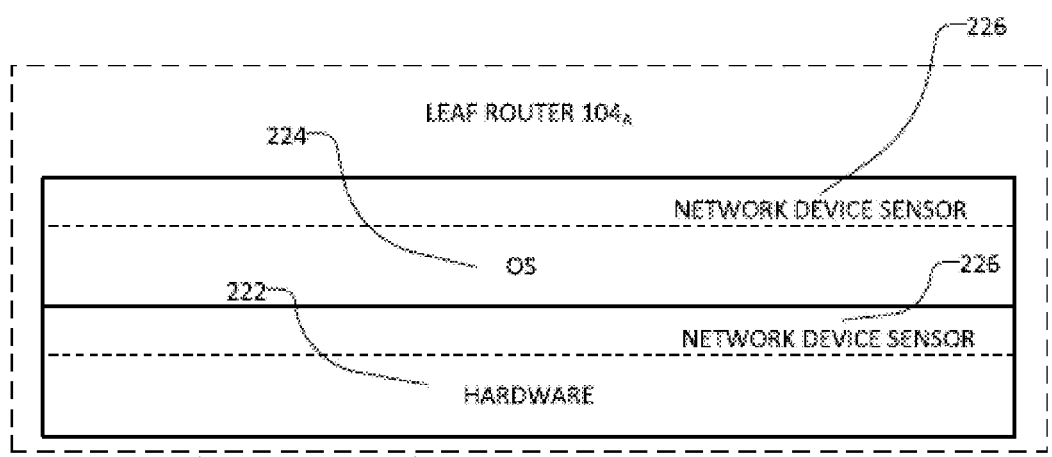
FIG. 2B illustrates a schematic diagram of an example sensor deployment in an example network device.

FIG. 2B illustrates a schematic diagram of an example sensor deployment 220 in an example network device. Network device is described as leaf router 104$_A$. However, this is for explanation purposes. Network device can be any other network device, such as any other switch, router, etc.

In this example, leaf router 104$_A$ can include network resources 222, such as memory, storage, communication, processing, input, output, and other types of resources. Leaf router 104$_A$ can also include an operating system environment 224. The operating system environment 224 can include any operating system, such as a network operating system. The operating system environment 224 can include processes, functions, and applications for performing networking, routing, switching, forwarding, policy implementation, messaging, monitoring, and other types of operations.

Leaf router 104$_A$ can also include sensor 226. Sensor 226 can be an agent configured to capture network data, such as flows or packets, sent and received by leaf router 104$_A$. Sensor 226 can also be configured to capture other information, such as processes, statistics, alerts, status information, device information, etc. Moreover, sensor 226 can be configured to report captured data to a remote device or network, such as collector 118, for example. Sensor 226 can report information using one or more network addresses associated with leaf router 104$_A$. For example, sensor 226 can be configured to report information using an IP assigned to an active communications interface on leaf router 104$_A$.

Leaf router 104$_A$ can be configured to route traffic to and from other devices or networks, such as server 106$_A$. Accordingly, sensor 226 can also report data reported by other sensors on other devices. For example, leaf router 104$_A$ can be configured to route traffic sent and received by server 106$_A$ to other devices. Thus, data reported from sensors deployed on server 106$_A$, such as VM and hypervisor sensors on server 106$_A$, would also be observed by sensor 226 and can thus be reported by sensor 226 as data observed at leaf router 104$_A$. Data reported by the VM and hypervisor sensors on server 106$_A$ can therefore be a subset of the data reported by sensor 226.

The report(s) of sensors 226 can include timestamps associated with captured network traffic received, transmitted or generated by the host/node (e.g. operating system environment 224 and network resources 222). Sensors 226 can also associate a timestamp indicating when each respective sensor 226 transmits its respective report(s) to the remote device, such as collectors 118 illustrated in FIG. 1. Regardless, the timestamps associated by sensors 226 can be based on a clock of the host/node (e.g. operating system environment 224 and network resources 222) where each respective sensor resides.

Sensor 226 can run as a process or component (e.g., firmware, module, hardware device, etc.) in leaf router 104$_A$. Moreover, sensor 226 can be installed on leaf router 104$_A$ as a software or firmware agent. In some configurations, leaf router 104$_A$ itself can act as sensor 226. Moreover, sensor 226 can run within the operating system 224 and/or separate from the operating system 224.

FIG. 2C illustrates a schematic diagram of an example reporting system 240 in an example sensor topology. Leaf router 104$_A$ can route packets or traffic 242 between fabric 112 and server 106$_A$, hypervisor 108$_A$, and VM 110$_A$. Packets or traffic 242 between VM 110$_A$ and leaf router 104$_A$ can flow through hypervisor 108$_A$ and server 106$_A$. Packets or traffic 242 between hypervisor 108$_A$ and leaf router 104$_A$ can flow through server 106$_A$. Finally, packets or traffic 242 between server 106$_A$ and leaf router 104$_A$ can flow directly to leaf router 104$_A$. However, in some cases, packets or traffic 242 between server 106$_A$ and leaf router 104$_A$ can flow through one or more intervening devices or networks, such as a switch or a firewall.

Moreover, VM sensor 116 at VM 110$_A$, hypervisor sensor 116 at hypervisor 108$_A$, network device sensor 116 at leaf router 104$_A$, and any server sensor at server 106$_A$ (e.g., sensor running on host environment of server 106$_A$), can send reports 244 to collector 118 based on the packets or traffic 242 captured at each respective sensor. Reports 244 from VM sensor 116 to collector 118 can flow through VM 110$_A$, hypervisor 108$_A$, server 106$_A$, and leaf router 104$_A$. Reports 244 from hypervisor sensor 116 to collector 118 can flow through hypervisor 108$_A$, server 106$_A$, and leaf router 104$_A$. Reports 244 from any other server sensor at server 106$_A$ to collector 118 can flow through server 106$_A$ and leaf router 104$_A$. Finally, reports 244 from network device sensor 116 to collector 118 can flow through leaf router 104$_A$.

Reports 244 can include any portion of packets or traffic 242 captured at the respective sensors. Reports 244 can also include other information, such as timestamps, process information, sensor identifiers, flow identifiers, flow statistics, notifications, logs, user information, system information, etc. Moreover, reports 244 can be transmitted to collector 118 periodically as new packets or traffic 242 are captured by a sensor. Further, each sensor can send a single report or multiple reports to collector 118. For example, each of the sensors 116 can be configured to send a report to collector 118 for every flow, packet, message, communication, or network data received, transmitted, and/or generated by its respective host (e.g., VM 110$_A$, hypervisor 108$_A$, server 106$_A$, and leaf router 104$_A$). As such, collector 118 can receive a report of a same packet from multiple sensors.

The reports 224 of sensors 116 can include timestamps associated with captured network traffic received, transmitted or generated by the host/node (VM 110$_A$, hypervisor 108$_A$, server 106$_A$, and leaf router 104$_A$). Sensors 116 can also associate a timestamp indicating when each of the sensors 116 transmits reports 224 to the collector 118. Regardless, the timestamps associated by sensors 226 can be based on a clock of the host/node (e.g. VM 110$_A$, hypervisor 108$_A$, server 106$_A$, and leaf router 104$_A$) where each of the respective sensors 116 resides.

For example, a packet received by VM 110$_A$ from fabric 112 can be captured and reported by VM sensor 116. Since the packet received by VM 110$_A$ will also flow through leaf router 104$_A$ and hypervisor 108$_A$, it can also be captured and reported by hypervisor sensor 116 and network device sensor 116. Thus, for a packet received by VM 110$_A$ from fabric 112, collector 118 can receive a report of the packet from VM sensor 116, hypervisor sensor 116, and network device sensor 116.

Similarly, a packet sent by VM 110$_A$ to fabric 112 can be captured and reported by VM sensor 116. Since the packet sent by VM 110$_A$ will also flow through leaf router 104$_A$ and hypervisor 108$_A$, it can also be captured and reported by hypervisor sensor 116 and network device sensor 116. Thus, for a packet sent by VM 110$_A$ to fabric 112, collector 118 can receive a report of the packet from VM sensor 116, hypervisor sensor 116, and network device sensor 116.

On the other hand, a packet originating at, or destined to, hypervisor 108$_A$, will can be captured and reported by hypervisor sensor 116 and network device sensor 116, but not VM sensor 116, as such packet would not flow through VM 110$_A$. Moreover, a packet originating at, or destined to, leaf router 104$_A$, will be captured and reported by network device sensor 116, but not VM sensor 116, hypervisor sensor 116, or any other sensor on server 106$_A$, as such packet would not flow through VM 110$_A$, hypervisor 108$_A$, or server 106$_A$.

Each of the sensors 116 can include a respective unique sensor identifier on each of the reports 244 it sends to collector 118, to allow collector 118 to determine which sensor sent the report. The reports 244 used to analyze network and/or system data and conditions for troubleshooting, security, visualization, configuration, planning, and management. Sensor identifiers in the reports 244 can also be used to determine which sensors reported what flows. This information can then be used to determine sensor placement and topology, as further described below. Sensor placement and topology information can be useful for analyzing the data in the reports 244, as well as troubleshooting, security, visualization, configuration, planning, and management.

Figure 3:
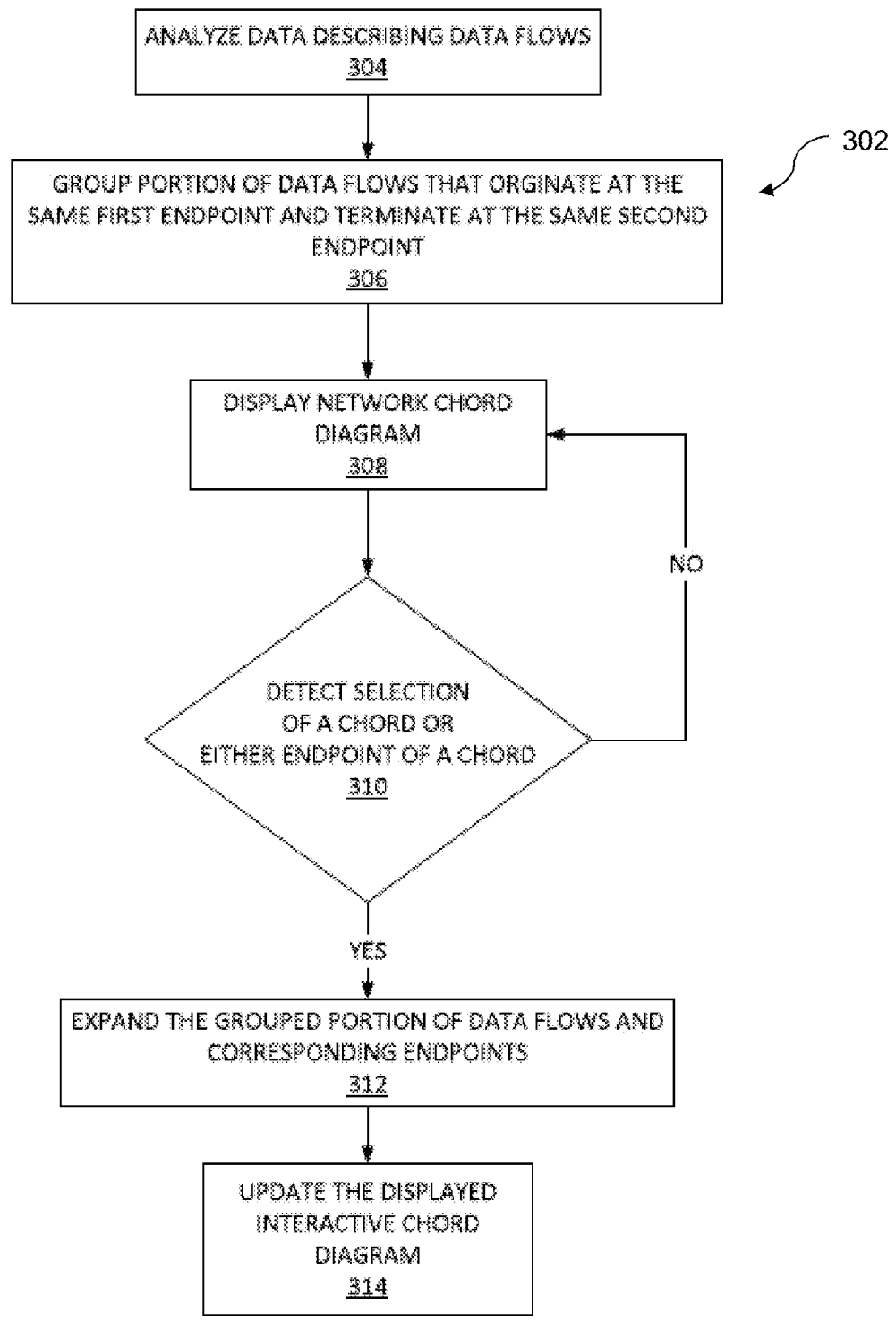
FIG. 3 illustrates an example method for generating an interactive hierarchical network chord diagram.

The visualization of the data collected from sensors 116 can be useful in the management and monitoring of a datacenter in which sensors 116 reside. However, with the large number of hosts within the datacenter, visualization of the data flows within the datacenter can be difficult to consume. As such, the data collected from sensors 116 that describe the data flows within the datacenter can be abstracted and displayed on an interactive hierarchical network chord diagram (or network chord diagram). FIG. 3 illustrates an example method for generating an interactive hierarchical network chord diagram (or network chord diagram). Example method 302 begins at step 304. At step 304, a dataflow monitoring system analyzes the data describing data flows. For example as illustrated in FIG. 1, collector 118 can be the dataflow monitoring system configured to analyze the data describing the data flows reported by sensors 116. In some embodiments, the collector 118 can include analytics engines 120. Analytics engines 120 can configured to do the actual analysis of the data reported by sensors 116. In some embodiments, analytics engines 120 can be separate from collector 118 and can operate in conjunction or independently with collector 118, when analyzing the data reported by sensors 116.

The data describing the data flows can describe the data flows between logical entities or endpoints of a data enter. A logical entity or endpoint can represent a host (e.g. server, switch, VM, hypervisor, router, etc.), cluster of hosts or one or more subnets. Furthermore data describing the data flows can also describe the attributes of each dataflow (e.g. a sending or originating host, a receiving or terminating host, a sending host subnet, a receiving host subnet and the one or more policies that correspond to the dataflow, etc.).

At step 306, the dataflow monitoring system (e.g. analytics engine 120, collector 118, etc.) can group portions of data flows that originate at the same first endpoint and terminate the same second endpoint. The dataflow monitoring system (e.g. analytics engine 120, collector 118, etc.) can identify the originating endpoint and terminating endpoint of each data flow from the identified attributes of each data flow. For example, analytics engine 120 can identify the sending and receiving hosts of each dataflow and group of the data flows according to the same sending host and/or the same receiving host. In another example, analytics engine 120 can group portions of the data flows by the subnet of the sending host and/or the subnet of the receiving host.

Sub-groups can also be identified within each grouped portion of data flows. The dataflow monitor (e.g. collector 118 or analytics engine 120) can identify or determine sub-groups within each grouped portion. For example analytics engine 120 groups portions of data flows that all originate at a subnet and all terminate at another different subnet. Analytics engine 120 can also identify one or more subgroups within each subnet group. For example, analytics engine 120 can identify one or more clusters of hosts within each subnet group. Additionally, analytics engine 120 can identify the portions of data flows within the grouped portion of data flows that originate and/or terminate at the same cluster of hosts within each subnet group. The dataflow monitor system can identify as many different levels of abstraction as needed. For instance, continuing from the example above, analytics engine 120 can identify or group one or more sub-groups within each sub-group (e.g. on a host basis).

At step 308, the dataflow monitoring system (e.g. analytics engine 120, collector 118, etc.) can then display a network chord diagram of the analyzed data describing the data flows on a user interface of a computing device (smart phone, laptop, desktop, etc.). Each cord displayed in the network chord diagram represents a grouped portion of bi-directional data flows that originate at the same first endpoint and terminate at the same second endpoint. Each chord in the network chord diagram can also represent one or more policies that are similarly enforced over each represented grouped portion of data flows. Each endpoint or any abstraction thereof visualized in the network chord diagram represents an endpoint that a grouped portion of data flows or an individual dataflow originates from or terminates at. In some embodiments each endpoint visualized in the network cord diagram represents one or more subnets. In some embodiments each endpoint visualized in the network chord diagram represents one or more clusters of hosts. In some embodiments each endpoint visualized in the network chord diagram represents an individual host.

Figure 4A:
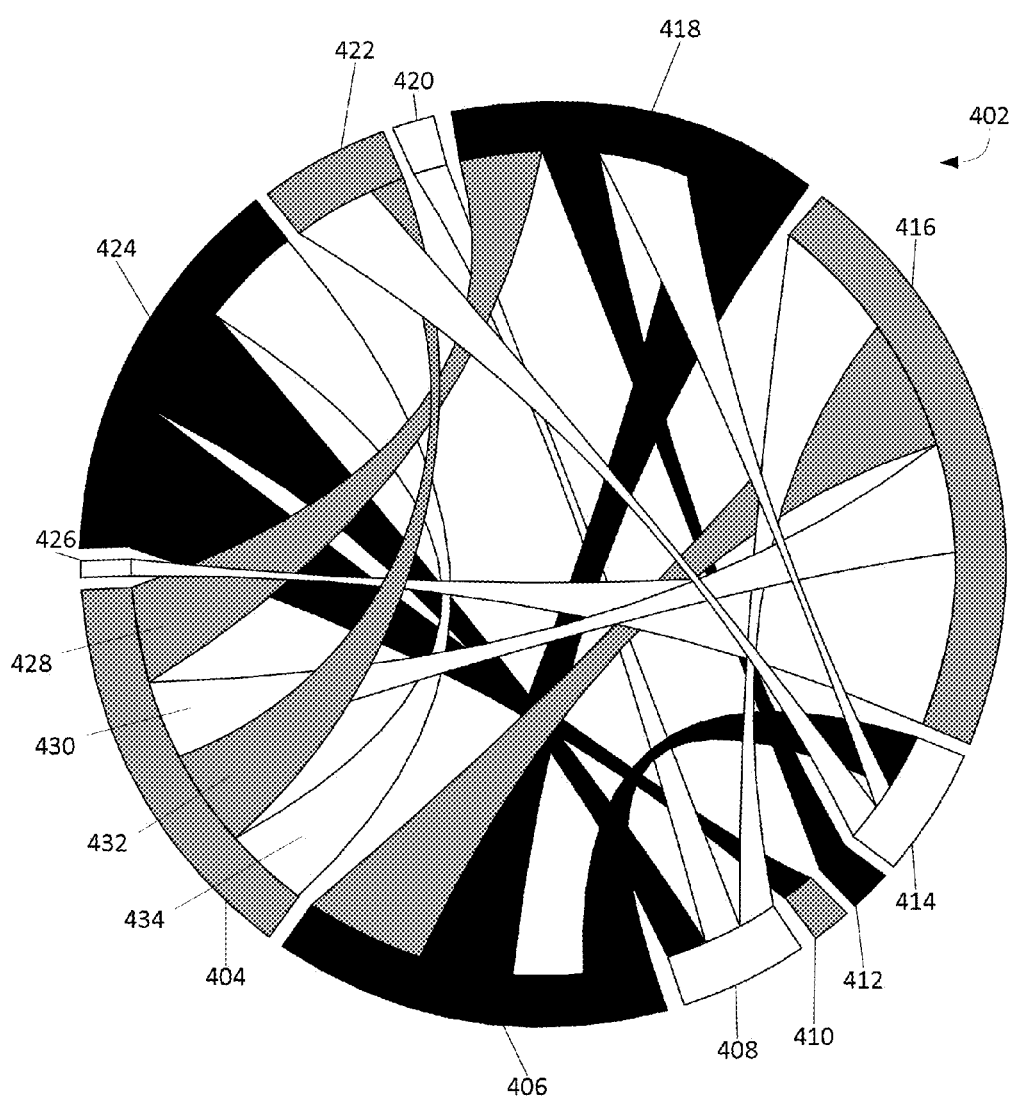
FIG. 4A illustrates an example interactive hierarchical network chord diagram at a high level of abstraction.
Figure 4B:
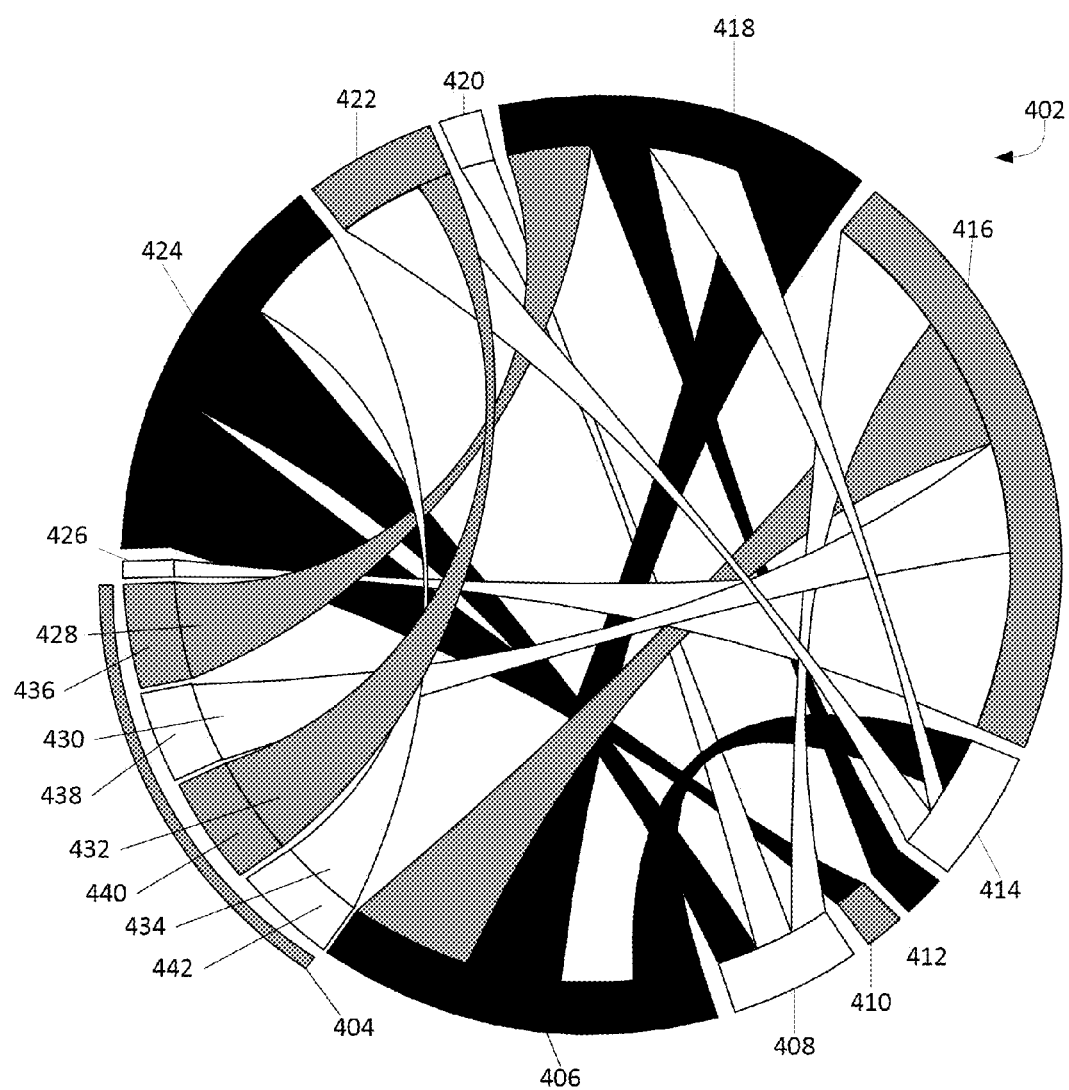
FIG. 4B illustrates an example of an updated interactive hierarchical network chord diagram with an expanded endpoint.
Figure 4C:
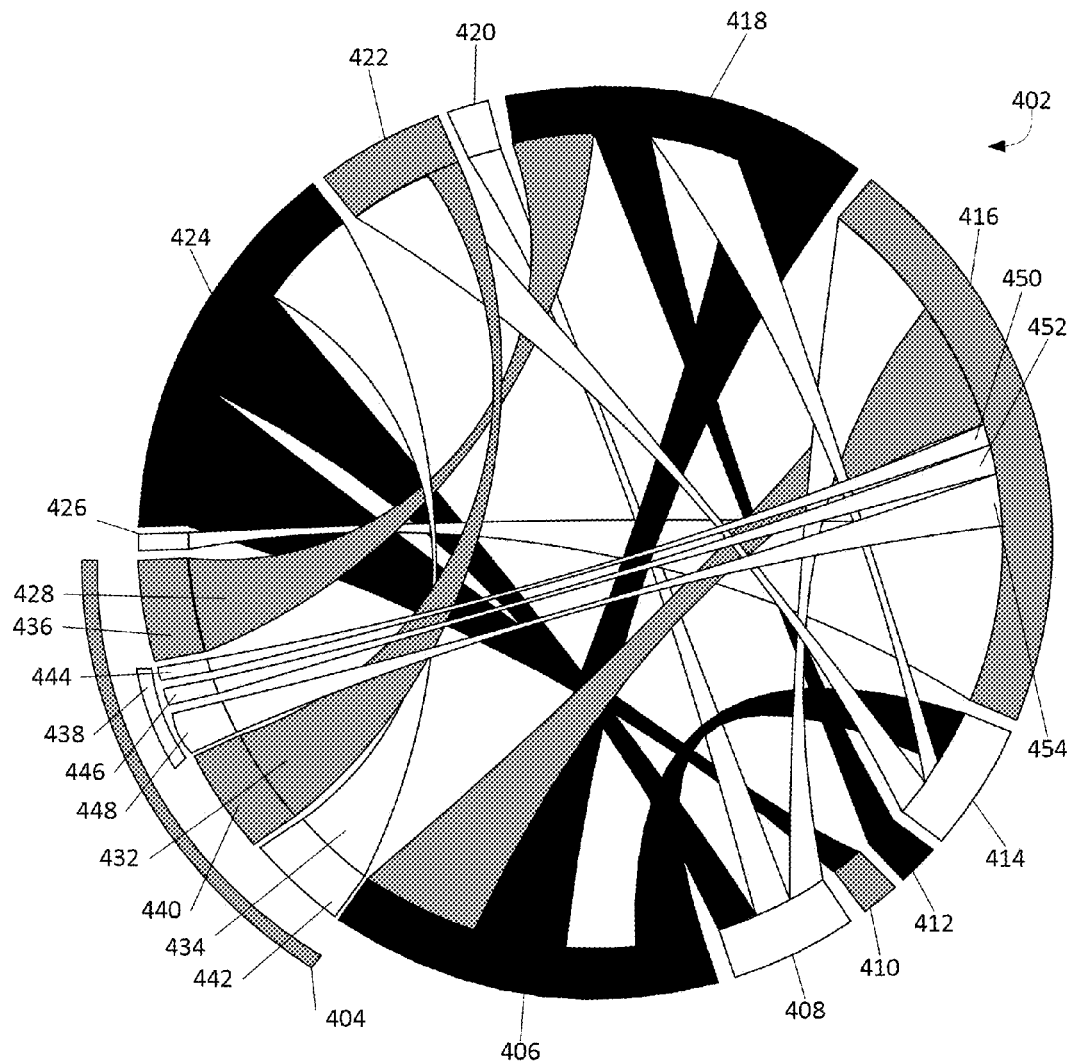
FIG. 4C illustrates an example of an updated interactive hierarchical network chord diagram with an expanded sub-endpoint and expanded chord.

An example of a network chord diagram is shown in FIGS. 4A-4C. FIGS. 4A-4C all illustrate example visualizations of the same chord diagram 402. Example chord diagram 402 includes multiple chords (e.g. 428, 430, 432 and 434) and multiple endpoints (e.g. 404, 406, 408, 410, 412, 414, 416, 418, 420, 422, 424 and 426). As illustrated each chord, 428, 430, 432 and 434, all terminate or originate at endpoints 404, 416, 418, 422 and 424. Each cord represents a grouped portion of data flows that all originate from one endpoint and terminate at another endpoint. For example, as illustrated in FIG. 4A, example chord diagram 402 includes chord 428 that originates/terminates at endpoint 404 and terminates/originates at chord 418.

At step 310, the dataflow monitoring system determines whether a chord or either endpoint of a chord has been selected in the network chord diagram. If the dataflow monitoring system determines a chord or an endpoint of the chord have not been selected, then the dataflow monitoring system continues to display the interactive hierarchical network chord diagram. However, if the dataflow monitoring system determines a chord or either endpoint of the chord has been selected, then the method proceeds to step 312.

At step 312, the dataflow monitoring system (e.g. analytics engine 120, collector 118, etc.) expands the grouped portion of data flows and corresponding endpoints. In some embodiments, selection of the chord causes the dataflow monitoring system to expand the grouped portion of data flows and/or either or both endpoints of the grouped portion of data flows. For example, selection of the chord causes analytics engine 120 to expand the represented grouped portion of data flows into sub-groupings of data flows. In another example, selection of the chord causes analytics engine 120 to expand one or both of the endpoints of the selected chord into sets of sub-endpoints. In another example, selection of the chord causes analytics engine 120 to expand the grouped portion of data flows into sub-groupings of data flows and one or both endpoints of the chords into sets of sub-endpoints.

In some embodiments, selection of an endpoint expands the network topology constructed using the dataflow monitoring system (e.g. analytics engine 120, collector 118, etc.) to expand the represented endpoint or the corresponding grouped portion of data flows. The expansion of the represented endpoint is based on the identified attributes of each corresponding grouped portions of data flows. As such, selection of an endpoint can cause analytics engine 120 to expand the represented endpoint into a more granular representation of the network topology. Furthermore, in some embodiments, selection of an endpoint also causes analytics engine 120 to expand the corresponding grouped portion of data flows (either originating from or terminating at the represented endpoint) into sub-groupings of data flows. For example, the selected endpoint represents a subnet. As such the dataflow monitoring system identifies clusters of hosts within the subnet (from the attributes of the corresponding grouped portion of data flows) and expands the subnet into said clusters of hosts. In another example, the selected endpoint represents a cluster of hosts. As such, the dataflow monitoring system (e.g. analytics engine 120, collector 118, etc.) identifies the individual hosts within the clusters of hosts (from the attributes of the corresponding grouped portion of data flows) and can expand the cluster of hosts into individual hosts.

In some embodiments, using the above described techniques, the selection of an endpoint causes the dataflow monitoring system (e.g. analytics engine 120, collector 118, etc.) to expand the grouped portion of data flows that terminate at or originate from the represented endpoint.

In some embodiments, using the above described techniques, selection of any endpoint of a chord or the chord itself causes the dataflow monitoring system (e.g. analytics engine 120, collector 118, etc.) to expand the represented endpoint, the corresponding grouped portion of data flows and the corresponding chord(s) other endpoint(s).

At step 314, the dataflow monitoring system (analytics engine 120, collector 118, etc.) updates the displayed network chord diagram to include a set of sub-chords and the set of sub-endpoints. The sub-chords represent the sub-groupings of data flows that originate and/or terminate at the set of sub-endpoints. An example of the updated display of the network chord diagram is illustrated in FIG. 4B. FIG. 4B illustrates the updated display after the selection of endpoint 404. Expanded endpoint 404 results in sub-endpoint 436, 438, 440 and 442. Sub-endpoint 436, 438, 440 and 442 correspond with chords 428, 430, 432 and 434 respectively. In some embodiments, as illustrated in FIG. 4B, endpoint 404 represents a subnet and sub-endpoints 436, 438, 440 and 442 represent different clusters of hosts. In other embodiments, as illustrated in FIG. 4B, endpoint 404 represents a subnet and sub-endpoints 436, 438, 440 and 442 represent different individual hosts. In other embodiments, as illustrated in FIG. 4B, endpoint 404 represents a cluster of hosts and sub-endpoints 436, 438, 440 and 442 represent different individual hosts.

In some circumstances, the user (e.g. network operator) may want be informed of the previous level of abstraction while the current endpoint is expanded. For example, a representation of the previous level of abstraction can be included in the network chord diagram. FIG. 4B illustrates this notifying representation. In FIG. 4B, endpoint 404 is displayed outside the sub-endpoints 428, 430, 432 and 434. Endpoint 404 in FIG. 4B represents the previous level of abstraction of the lower level of abstraction sub-endpoints 428, 430, 432 and 434.

It should be noted that for sake of simplicity, FIG. 4B only illustrates the expansion of the selected endpoint 404. However, using the above described techniques, the chords and/or the other corresponding endpoints of the chords can additionally be expanded. However, for sake of simplicity, in this example, as illustrated in FIG. 4B, only the endpoints are expanded.

The network chord diagram can be further drilled down to as many levels of abstraction as needed. For example, using the above described techniques, the sub-endpoints can be further expanded into sub-sub-endpoints. The expansion of the sub-endpoints can be based on the identified attributes of the sub-groupings of data flows. For example, following FIG. 4B, assume that the sub-endpoints and chords represent grouped portion of data flows that originate from and terminate at identified clusters of hosts (428, 430, 432, 434) within the subnet endpoint 404. The dataflow monitor (e.g. analysis engine 120, collector 118, etc.) can identify the individual hosts within those clusters of hosts and the sub-groupings of data flows that originate from or terminate at those identified individual hosts. Again the expansion of the sub-endpoints and/or corresponding chords can be triggered by the selection of a sub-endpoints, corresponding chords/sub-chords and/or the other endpoints/sub-endpoints of the corresponding chord/sub-chord.

The interactive hierarchical network chord diagram (e.g. network chord diagram 402) can visualize the expansion of sub-endpoints. Following the previous example, FIG. 4C illustrates an example updated display of the interactive hierarchical network chord diagram drilled down to an even lower level of abstraction. Network chord diagram 402 of FIG. 4C illustrates the selection of sub-endpoint 438 results in the expansion of sub-endpoint 438 into sub-sub-endpoint 444, 446 and 448. In this example, the expansion of sub-endpoint 438 also expands chord 430 into a set of sub-chords 450, 452 and 454. Sub-chord 450, 452 and 454 originate or terminate at sub-endpoints 436, 438 and 440, respectively.

Again, the user (e.g. network operator) can be informed of the previous level of abstraction while the current level of abstraction is expanded (e.g. the expanded endpoint, sub-endpoint, sub-sub endpoint, sub-sub-sub endpoint, etc.). In fact a notifying representation can be displayed for any displayed level of abstraction. For example, a representation of the previous level of abstraction can be included in the network chord diagram. FIG. 4C illustrates this notifying representation. In FIG. 4C, endpoint 404 and sub-endpoint 430 is displayed outside the sub-sub-endpoints 444, 446 and 448. Endpoint 404 and sub-endpoint 430 in FIG. 4C represents the previous level of abstraction of the lower level of abstraction sub-sub-endpoints 444, 446 and 448.

Figure 4D:
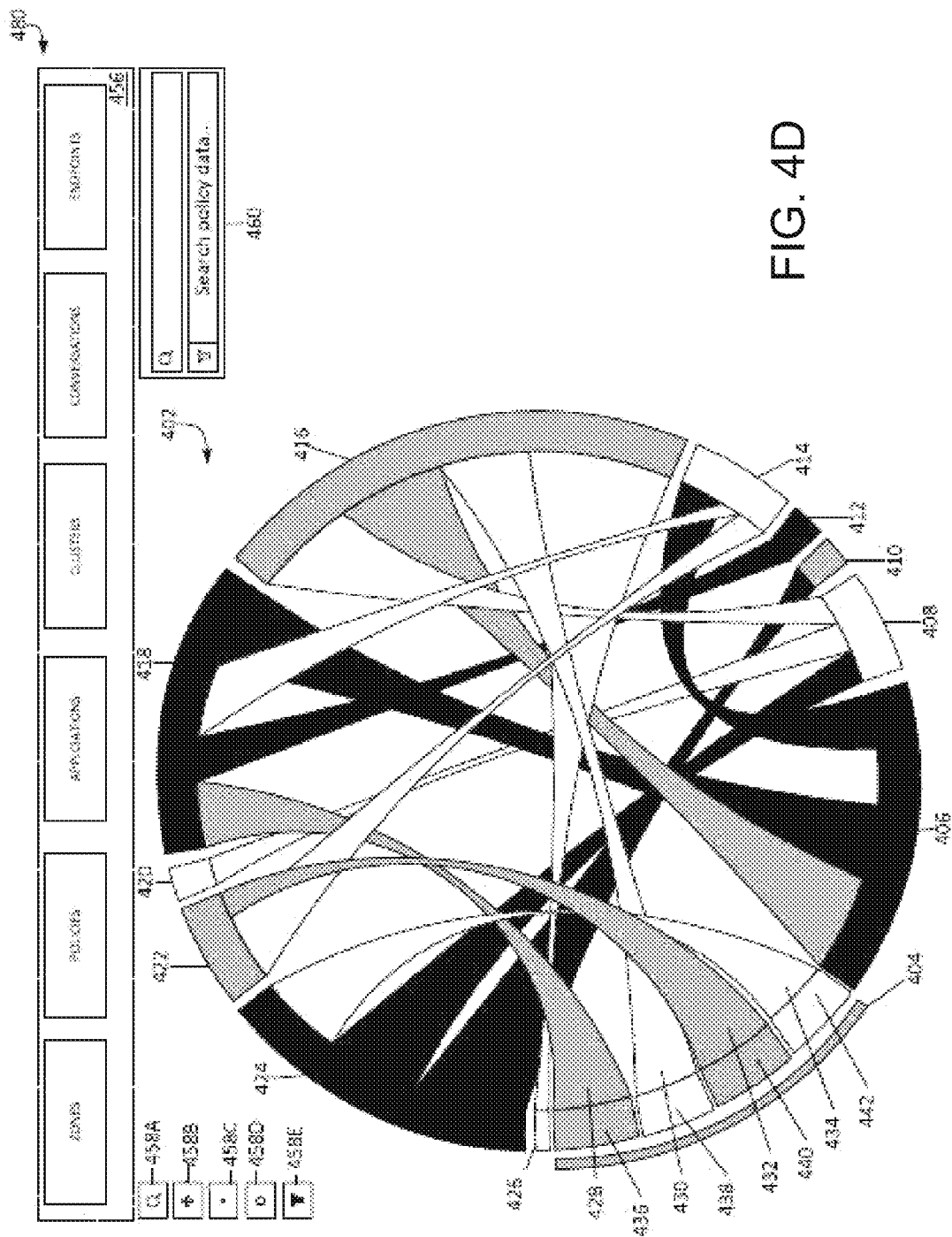
FIG. 4D and FIG. 4E illustrate example user interfaces for an interactive hierarchical network chord diagram.
Figure 4E:
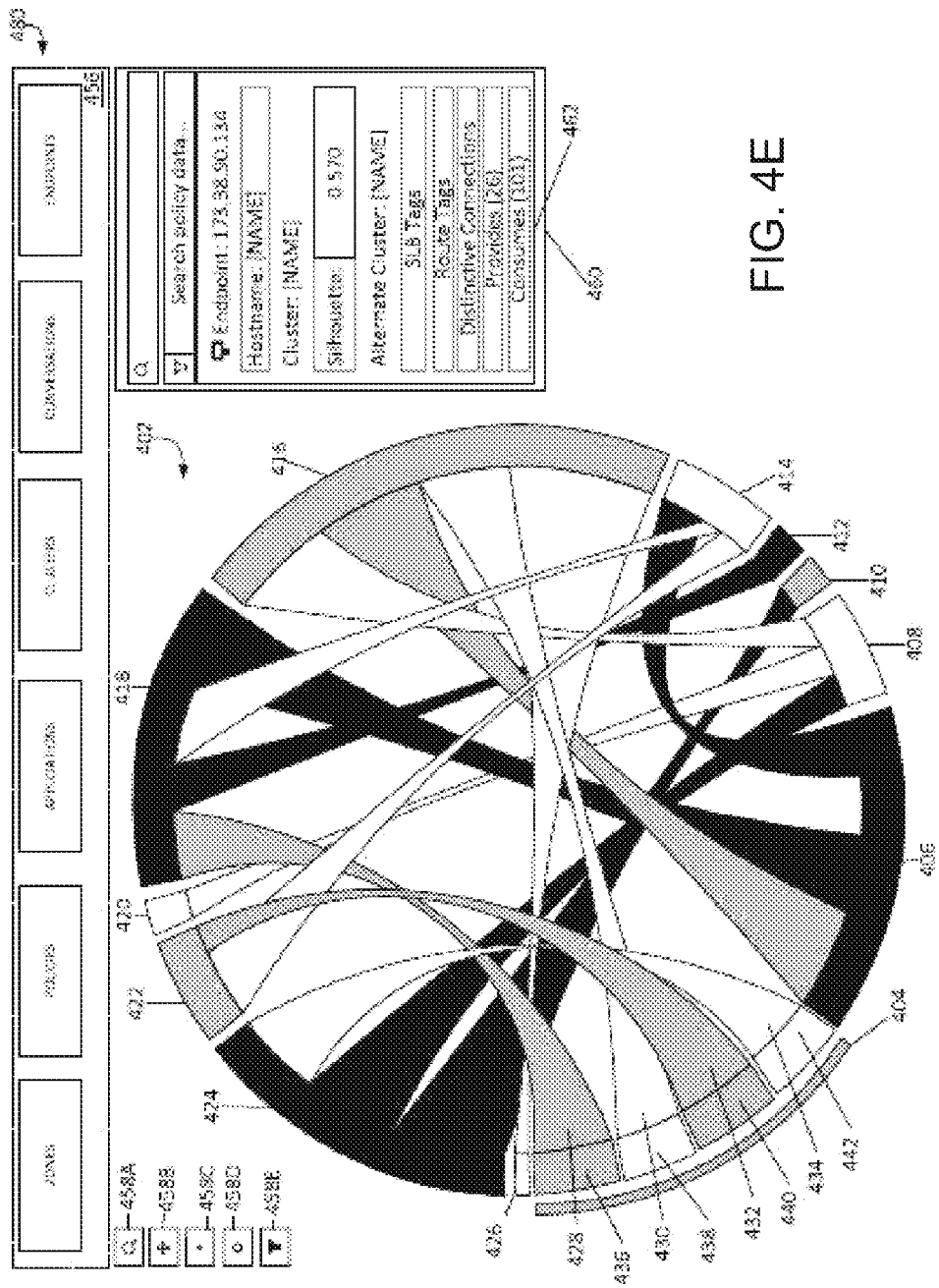

The user-interface (UI) displaying the network chord diagram can also include navigation tools and other graphical representations that display additional information related to network chord diagram. FIG. 4D and FIG. 4E illustrate example user interfaces for a network chord diagram. UI 480 includes example network chord diagram 402, display bar 456, navigation tools 458 and search bar 460. Example network chord diagram 402 corresponds to the expanded network chord diagram 402 of FIG. 4B.

Display bar 456 can include multiple graphical representations to display additional information about the network overall or the network chord diagram itself (e.g. network chord diagram 402). For example, display bar 456 can display information about the different network zones (e.g. number and names of the different network zones within the network or network chord diagram 402), the policies enforced for each dataflow within the network or network chord diagram 402 (e.g. the number of policies, the name of each policy, details about what each policy is enforcing, etc.), the number of applications within the network, the clusters within the network or network chord diagram 402 (e.g. the names of each cluster, the number of clusters within the network, the logical entities that are within each cluster, etc.), the number of dataflows or conversations that are occurring between each endpoint within the network or network chord diagram 402, the number of endpoints within the network or network chord diagram 402, etc.).

Navigation bar (458A, 458B, 458C, 458D and 458E or collectively as 458) can include a number of tools to navigate the displayed network chord diagram (e.g. network chord diagram 402). For example, navigation bar 458 can include magnification tool 458A to zoom in and out of the network chord diagram. Navigation bar 458 can include a manual navigation tool 458B to filter down the chord chart by only showing selected subnets/hosts. Navigation bar 458 can include a remove filter tool 458C to undo a selection of a selected subnet/host by toll 458B. Navigation bar 458 can include a remove unselected host tool 458D which filters out all unselected subnets/hosts. Navigation bar 458 can also include a search bar button 458E that, if selected, can trigger the display of a search bar. Other tools are also possible, such as centering tools, chord selection tools, remove all filters tool, etc.

Example UI 456 can also include a search bar. In some circumstances, the user (e.g. a network operator) may know and specifically want to search for a particular logical entity within the network as represented by the displayed network chord diagram. In some embodiments, as illustrated in FIG. 4E, entering the name of a logical entity or endpoint (e.g. subnet, clusters of hosts, individual hosts, etc.) in search bar 460, search bar 460 can return and display results in table 462. For example, as illustrated in FIG. 4E, the user has input a subnet endpoint 173.38.90.134 into search bar 460. As such, table 462 displays the illustrated results. The displayed results in FIG. 4E is only an illustration of what additional information UI 456 can display and such an illustration should not limit the scope of this application. For example, table 462 can include the name of the host, the name of the cluster, the silhouette score, and an alternate cluster. Since hosts are clustered based on their behavior, a host might potentially belong to an alternate cluster and maybe even more than one alternate cluster. The host has an affinity for each cluster called a "silhouette score." Thus the silhouette score shown in table 462 of FIG. 4E represents the hosts affinity for the named alternate cluster. The host will usually have a lower affinity for the alternate cluster. Additionally, table 462 can expand or further display other information relating to the searched endpoint. For instance, as illustrated in table 462, table 462 includes graphical representations, that if selected can display additional information about server load balancing (SLB) tags, route tags, distinctive connections with the searched endpoint and with other endpoints within the network, and the number of endpoints the search endpoint provides data to and consumes data from.

In some embodiments table 462 is dynamically linked to chord chart 402. When an endpoints or clusters found in the search in table 462 is clicked on the chord chart 402 can dynamically highlight or expand such endpoints or clusters to call out the element being selected. This feature is very helpful to dig up a node or cluster from a chord chart filled with thousands of elements.

In some embodiments, selection of the chord or endpoint can trigger display of additional information, similar to table 462. For example, assume, as FIG. 4E illustrates, endpoint 404 has been selected and expanded. Additionally assume endpoint 404 represents subnet 173.38.90.134. As such, the corresponding expansion is displayed in network chord diagram 402 and since endpoint 404 (representing subnet 173.38.90.134) has been selected; table 462 is generated and displayed. In such an embodiment, table 462 can also display additional information about the corresponding sub-endpoints 436, 438, 440 and 442. For example table 462 can additional display information related to the corresponding data flows originating/terminating at sub-endpoints 436, 438, 440 and 442 (e.g. the policies of each dataflow). In some embodiments, the user can select a specific chord to only view additional data about the selected chord.

In some embodiments, selection of a chord (including sub-chords, sub-sub chords or any level of abstraction of these chords) can also display a table similar to that of table 462. In such an embodiment, the selection of the chord triggers the display of information related to all corresponding endpoints. In some embodiments, the user can select a specific endpoint to only view additional data about the selected endpoint.

In other embodiments selection of an endpoint or chord (including all other iterations of abstracted levels of endpoints and chords) can collapse a previously selected and expanded endpoint and/or cord. Furthermore, selection of an endpoint and/or chord displays additional information for only the currently selected chord and/or endpoint. In other embodiments, the UI can display additional information for all the endpoints and/or chords selected by the user. The displayed additional information for all the endpoints and/or chords are removed only when specifically closed by the user.

Figure 5:
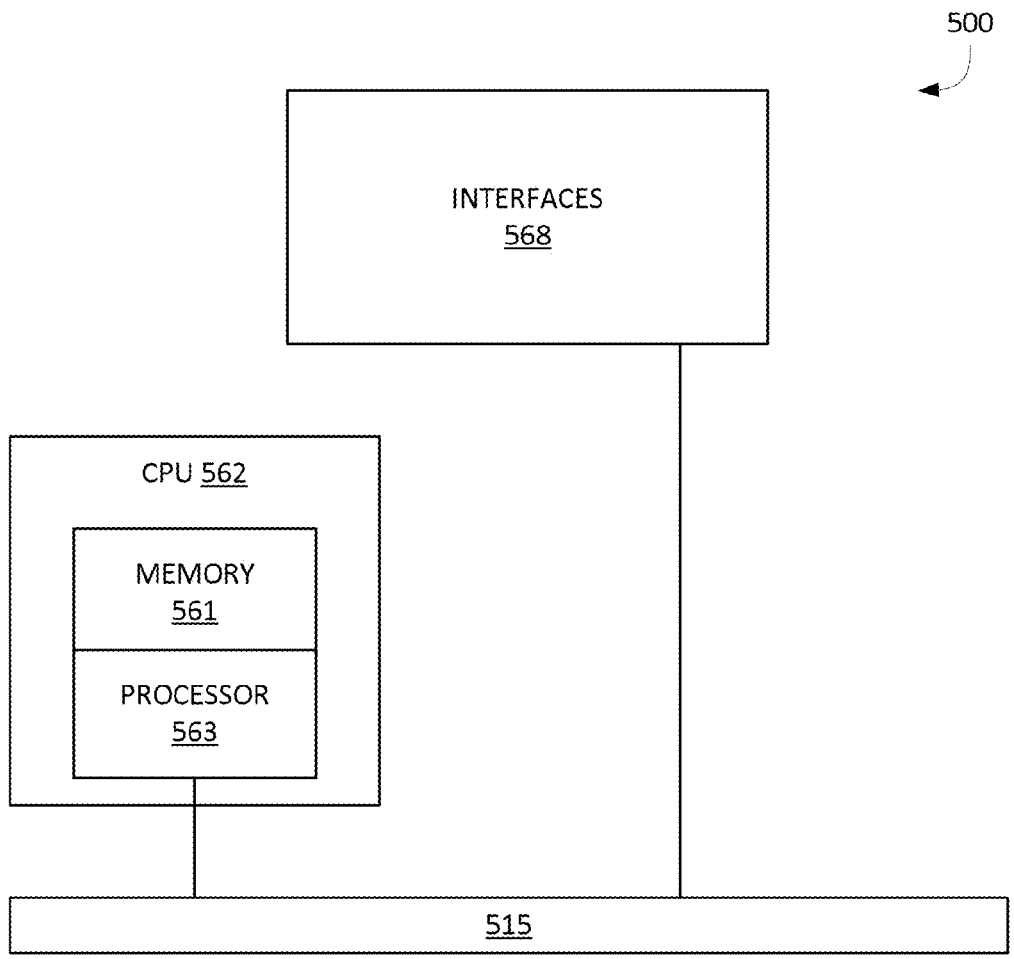
FIG. 5 illustrates an example network device.

FIG. 5 illustrates an example network device 510 according to some embodiments. Network device 510 includes a master central processing unit (CPU) 562, interfaces 568, and a bus 515 (e.g., a PCI bus). When acting under the control of appropriate software or firmware, the CPU 562 is responsible for executing packet management, error detection, and/or routing functions. The CPU 562 preferably accomplishes all these functions under the control of software including an operating system and any appropriate applications software. CPU 562 may include one or more processors 563 such as a processor from the Motorola family of microprocessors or the MIPS family of microprocessors. In an alternative embodiment, processor 563 is specially designed hardware for controlling the operations of router 510. In a specific embodiment, a memory 561 (such as non-volatile RAM and/or ROM) also forms part of CPU 562. However, there are many different ways in which memory could be coupled to the system.

The interfaces 568 are typically provided as interface cards (sometimes referred to as "line cards"). Generally, they control the sending and receiving of data packets over the network and sometimes support other peripherals used with the router 510. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 561) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 6A:
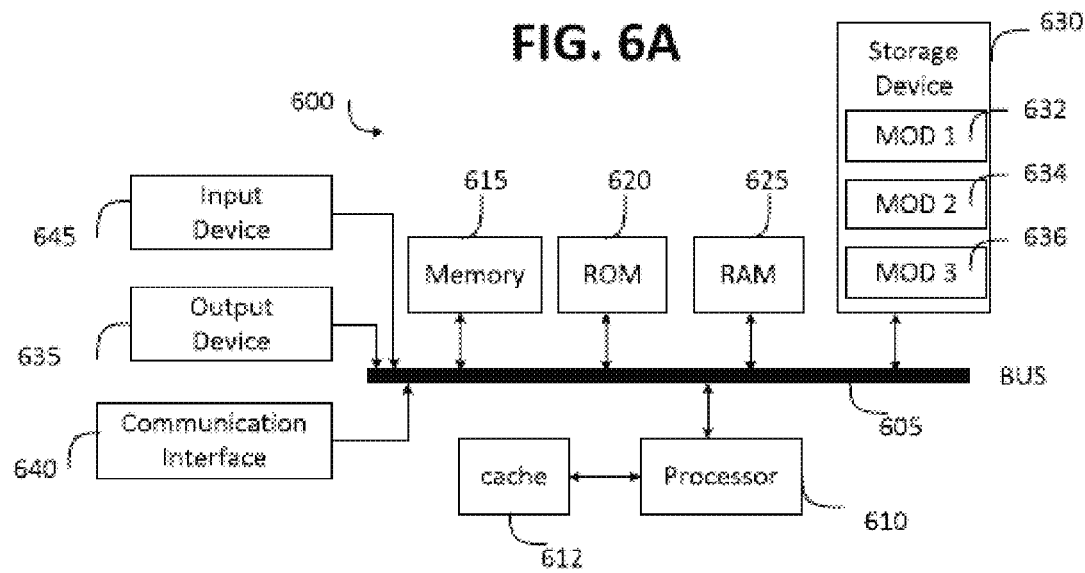
FIGS. 6A and 6B illustrate example system embodiments.
Figure 6B:
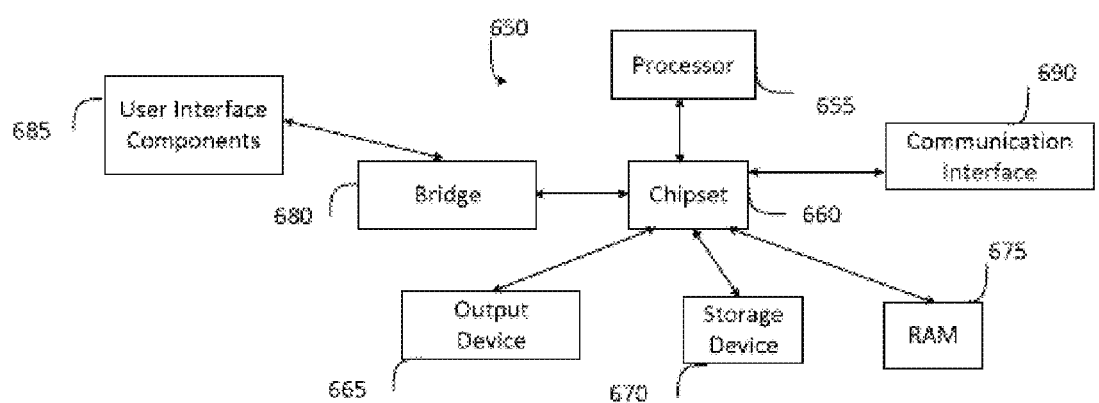

FIG. 6A and FIG. 6B illustrate example system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 670 and random access memory (RAM) 675, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 637, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 675, read only memory (ROM) 680, and hybrids thereof.

The storage device 630 can include software modules 638, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates an example computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655. It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

The invention claimed is:

1. A system for providing an interactive chord chart illustrating collections of data flows between logical entities, the system comprising:
    a dataflow monitoring system, the dataflow monitoring system configured to record data describing data flows between hosts in two or more subnets, the data describing a first data flow includes a sending host, a receiving host, a sending host subnet, a receiving host subnet, and a policy corresponding to the first data flow;
    one or more processors;
    a memory containing instructions that, when executed by the one or more processors, cause the dataflow monitoring system to generate the interactive chord chart by:
        analyzing the data describing the data flows, determining a grouped portion of the data flows that originate from a first endpoint and terminate at a second endpoint, the first endpoint and the second endpoint each corresponding to a respective subnet, a respective cluster of hosts, and a respective individual host, displaying the interactive chord chart to include a chord with the first endpoint and the second endpoint, the chord representing the grouped portion of the data flows that originate from the first endpoint and terminate at the second endpoint;

after receiving a selection of the chord or the first endpoint, expanding the grouped portion of the data flows into sub-groupings of data flows and the first endpoint into a set of sub-endpoints; and updating display of the interactive chord chart to include a set of sub-chords corresponding to at least the set of sub-endpoints, the set of sub-chords representing the sub-groupings of data flows that originate from the set of sub-endpoints.

2. The system of claim 1, wherein the first endpoint represents a first subnet and the second endpoint represents a second subnet.

3. The system of claim 2, wherein the set of sub-endpoints represents a cluster of hosts.

4. The system of claim 1, wherein the first endpoint represents a first cluster of hosts and the second endpoint represents a second cluster of hosts.

5. The system of claim 4, wherein the set of sub-endpoints represents a plurality of individual hosts.

6. The system of claim 1, wherein the chord represents policies that are enforced within the grouped portion of the data flows that originate from the first endpoint and terminate at the second endpoint.

7. The system of claim 1, wherein after receiving the selection of the chord or the first endpoint, the instructions, when executed by the one or more processors, further cause the dataflow monitoring system to generate the interactive chord chart by:

expanding the second endpoint into a second set of sub-endpoints; and updating display of the interactive chord chart to include the set of sub-chords terminating at the second set of sub-endpoints.

8. A non-transitory computer readable medium containing instructions that, when executed by a dataflow monitoring device, cause the dataflow monitoring device to:

analyze data describing data flows;

determine a grouped portion of the data flows that originate from a first endpoint and terminate at a second endpoint, the first endpoint and the second endpoint each correspond to at least a respective subnet, a respective cluster of hosts, and a respective individual host;

display a network chord chart to include a chord with the first endpoint and the second endpoint, the chord representing the grouped portion of the data flows that originate from the first endpoint and terminate at the second endpoint;

after receiving a selection of the chord or the first endpoint, expand the grouped portion of the data flows into sub-groupings of data flows; and update display of the network chord chart to include a set of sub-chords.

9. The non-transitory computer readable medium of claim 8, wherein the selection of the chord or the first endpoint, further causes the dataflow monitoring device to:

expand the first endpoint into a set of sub-endpoints; and update display of the network chord chart to include the set of sub-chords originating from the set of sub-endpoints.

10. The non-transitory computer readable medium of claim 9, wherein the set of sub-endpoints represents clusters of hosts.

11. The non-transitory computer readable medium of claim 9, wherein the set of sub-endpoints represents a plurality of individual hosts.

12. The non-transitory computer readable medium of claim 9, wherein the set of sub-chords corresponds to policies that are enforced within the sub-groupings of data flows originating from the set of sub-endpoints.

13. The non-transitory computer readable medium of claim 8, wherein the instructions further cause the dataflow monitoring device to:

record the data describing the data flows between hosts in two or more subnets, the data describing a first data flow includes a sending host, a receiving host, a sending host subnet, a receiving host subnet, and a policy corresponding to the first data flow.

14. The non-transitory computer readable medium of claim 8, wherein the first endpoint represents a first subnet and the second endpoint represents a second subnet.

15. The non-transitory computer readable medium of claim 8, wherein the first endpoint represents a first cluster of hosts and the second endpoint represents a second cluster of hosts.

16. The non-transitory computer readable medium of claim 8, wherein the chord represents one or more policies that are enforced within the grouped portion of the data flows that originate from the first endpoint and terminate at the second endpoint.

17. The non-transitory computer readable medium of claim 8, wherein receiving a selection of the first endpoint or the chord, further causes the dataflow monitoring device to:

expand the second endpoint into a set of second sub-endpoints; and update display of the network chord chart to include the set of sub-chords terminating at the second set of sub-endpoints.

18. A computer-implemented method for generating an interactive chord chart comprising:

analyzing data describing data flows;

determining a grouped portion of the data flows that originate from a first endpoint and terminate at a second endpoint, the first endpoint and the second endpoint each corresponding to at least a respective subnet, a respective cluster of hosts, and a respective individual host;

displaying the interactive chord chart to include a chord with the first endpoint and the second endpoint, the chord representing the grouped portion of the data flows that originate from the first endpoint and terminate at the second endpoint;

after receiving a selection of the chord or the first endpoint, expanding the grouped portion of the data flows into sub-groupings of data flows and the first endpoint into a set of sub-endpoints; and updating display of the interactive chord chart to include a set of sub-chords corresponding to at least the set of sub-endpoints, the set of sub-chords representing the sub-groupings of data flows that originate from the set of sub-endpoints.

19. The computer-implemented method of claim 18, wherein after receiving the selection of the chord or the first endpoint, the method further comprises:
- expanding the second endpoint into a second set of sub-endpoints; and
- updating display of the interactive chord chart to include the set of sub-chords terminating at the second set of sub-endpoints.

20. The computer-implemented method of claim 18, further comprising:
- after receiving a selection of a sub-chord from the set of sub-chords or a sub-endpoint from the set of sub-endpoints, expanding the sub-grouping of the data flows into sub-sub-groupings of data flows and the sub-endpoint into a set of sub-sub-endpoints; and
- updating display of the interactive chord chart to include a set of sub-sub-chords corresponding to at least the set of sub-sub-endpoints, the set of sub-sub-chords representing the sub-sub-groupings of data flows originating from the set of sub-sub-endpoints.

* * * * *